United States Patent

Ikuma et al.

[11] Patent Number: 6,001,272
[45] Date of Patent: Dec. 14, 1999

[54] METHOD FOR PRODUCING RARE EARTH BOND MAGNET, COMPOSITION FOR RARE EARTH BOND MAGNET, AND RARE EARTH BOND MAGNET

[75] Inventors: Ken Ikuma; Takatomo Shinohara; Kiyoshi Shiohara, all of Nagano, Japan

[73] Assignee: Seiko Epson Corporation, Japan

[21] Appl. No.: 08/952,498

[22] PCT Filed: Mar. 18, 1997

[86] PCT No.: PCT/JP97/00884

§ 371 Date: Mar. 10, 1998

§ 102(e) Date: Mar. 10, 1998

[87] PCT Pub. No.: WO97/35331

PCT Pub. Date: Sep. 25, 1997

[30] Foreign Application Priority Data

Mar. 18, 1996 [JP] Japan .................................... 8-061495
Mar. 29, 1996 [JP] Japan .................................... 8-077642
Jun. 21, 1996 [JP] Japan .................................... 8-161274

[51] Int. Cl.[6] .............................. H01F 41/02; H01R 1/08
[52] U.S. Cl. ..................................... 252/62.54; 252/62.55; 264/429; 264/427; 264/319; 264/327; 264/328.17; 264/328.19
[58] Field of Search ..................................... 148/301, 302; 252/62.55, 62.54; 264/429, 427, 319, 327, 328.17, 328.19

[56] References Cited

U.S. PATENT DOCUMENTS 5,051,200  9/1991  Srail et al. ............................ 252/62.54
5,176,842  1/1993  Kuwazawa et al. .................. 252/62.54

FOREIGN PATENT DOCUMENTS 3-142906   6/1982   Japan .
57-96813   6/1982   Japan .
63-289905  11/1988  Japan .
1-125905   5/1989   Japan ................................ 252/62.54
2-263937   10/1990  Japan .
3-142906   6/1991   Japan .
6-31405    11/1994  Japan .
6-314605   11/1994  Japan .
8-45720    2/1996   Japan .

Primary Examiner—C. Melissa Koslow
Attorney, Agent, or Firm—Harness, Dickey & Pierce, P.L.C.

[57] ABSTRACT

A method of the invention for manufacturing a rare earth bonded magnet has the steps of mixing a rare earth magnet powder, binder resin and an additive at a predetermined ratio, kneading the mixture at a temperature not lower than the thermal deformation temperature of the binder resin, granulating or graining the kneaded blend to granules of an average size ranging from 0.01 mm to 2 mm or so, conducting a compacting molding of the granulated material at a first temperature at which the binder resin is softened or molten, and cooling the molded body while keeping the molded body under pressure at least over a period in which the molded body cools down to a second temperature which s below the first temperature, whereby a rare earth bonded magnet is obtained having a low porosity, high dimensional precision and superior magnetic characteristic.

32 Claims, No Drawings

METHOD FOR PRODUCING RARE EARTH BOND MAGNET, COMPOSITION FOR RARE EARTH BOND MAGNET, AND RARE EARTH BOND MAGNET

TECHNICAL FIELD

The present invention relates to a method of manufacturing a rare earth bonded magnet by binding magnet powder containing rare earth elements by a binder, a composition for use in the manufacture of a rare earth bonded magnet, and to a rare earth bonded magnet.

BACKGROUND ART

Bonded magnets are manufactured from mixtures (compounds) of magnetic powders and binding resins (organic binders), by pressure-molding the mixtures into desired magnet shapes. Among such bonded magnets, a special type of bonded magnet referred to as a rare earth bonded magnet is made up from a magnet powder which is composed of a magnetic material containing a rare earth element or elements. Methods of manufacturing rare earth bonded magnets are disclosed, for example, in Japanese Patent Publication No. 53-34640, Japanese Patent Publication No. 46-31841, Japanese Patent Publication No. 04-74421, Japanese Patent Laid-Open No. 59-136907, Japanese Patent Laid-Open No. 59-213104, Japanese Patent Laid-Open No. 02-153509, Japanese Patent Laid-Open No. 60-211908, Japanese Patent Laid-Open No. 60-216523, Japanese Patent Laid-Open No. 61-164215, Japanese Patent Laid-Open No. 59-103309 and Japanese Patent Laid-Open No. 03-108301.

The methods of manufacturing rare earth bonded magnets are broadly sorted into compaction molding, injection molding and extrusion molding.

In compaction molding, the aforesaid compound is packed in a press mold and compacted at a room temperature so as to form a green body. Subsequently, when the binding resin is a thermosetting resin, the resin is hardened, whereby a magnet is obtained. This method enables the molding to be carried out with smaller amount of binding resin than other methods, resulting in a smaller resin content in the product magnet, thus advantageously contributing to improvement in the magnetic characteristics of the magnet.

Extrusion molding is a method in which heated molten compound extruded from an extruder die is solidified by cooling and then cut at a desired length, whereby a magnet is obtained. This method in one hand offers an advantage in that it permits easy production of thin-walled or elongated magnet by virtue of a comparatively large molding versatility on the shape of product magnet, but on the other hand suffers from a problem in that it requires, in order to ensure a sufficiently high fluidity of the molten compound during the molding, a greater amount of binding resin to be used as compared with the compaction molding method, with the result that the magnetic characteristics are impaired due to increased resin content in the product magnet.

In injection molding, the aforesaid compound, which has been heated and molten to exhibit sufficiently high fluidity, is poured into a mold so as to form a magnet of a desired shape. This method offers molding versatility on the magnet shape even greater than that offered by the extrusion molding method, enabling easy fabrication of magnets having irregular configurations. However, this method requires higher level of fluidity of the molten compound and, hence, a greater content of the binder resin than required in the extrusion molding method, resulting in poor magnetic characteristics of the product magnet due to increased content of the binder resin in the product magnet.

Among these methods, the compaction molding method enables production of magnets having superior magnetic performance as compared with other methods. Manufacture of bonded magnets by the known compaction molding method, however, suffers from the following disadvantages.

Firstly, it is to be pointed out that rare earth bonded magnets manufactured by this method tend to exhibit high porosity, which reduces mechanical strength and corrosion resistance of the product magnet. Hitherto, therefore, countermeasures have been taken in the compaction molding, such as use of high-pressure molding technique which employs a compaction pressure as high as 70 kgf/mm$^2$ and anti-corrosion coating on the molded product. Elevated compaction pressure, however, heavily burdens the mold and molding machine, which in turn requires a greater dimensions of the mold and molding machine, incurring a rise of the production costs. In addition, the anti-corrosion coating does not achieve sufficient improvement in the resistance to corrosion.

A second problem is as follows. The compound is pelletized before subjected to the molding. It is often difficult, however, to smoothly charge the pellets of the compound into the mold and to completely fill up the mold cavity. In addition, pelletized compound does not permit delicate control of the rate of supply of the compound into the mold.

A third problem is as follows. When compaction molding is conducted on a compound containing a thermosetting resin, the compaction is effected at room temperature, regardless of whether the thermosetting resin is of the type which is in solid phase at the room temperature or of the type which is in liquid phase at the room temperature. Therefore, when the former type of thermosetting resin, i.e., the solid-phase resin, is used, moldability of the material is impaired, tending to exhibit greater porosity than that obtained when a thermoplastic resin is used. In addition, mechanical strength also tends to be reduced due to inferior dispersibility of the resin and the magnet powder. When the later-mentioned resin, i.e., the liquid-phase resin, is used, physical properties of the resin tends to be sensitively varied in accordance with the molding environment, e.g., temperature and humidity, often resulting in inferior charging of the mold, although a green body of high density is obtainable.

The second and third problems mentioned above cause the dimensions of the product magnets to substantially fluctuate from the target dimensions. Namely, the dimensional precision is impaired and the molding cannot be conducted at high degree of stability. These deficiencies are serious particularly when small-sized magnets are to be manufactured.

In order to obtain a product magnet in conformity with the target dimensions despite the substantial fluctuation in the dimensions, it is necessary that the molded article has dimensions greater than the target dimensions and that such molded article is subjected to a secondary processing such as milling or grinding into final shape and dimensions. Such a secondary work increases the number of steps of the manufacturing process, and increases the risk of production of unacceptable products, with the results that the production efficiency is lowered and the cost of production is raised.

The present inventors have discovered that one of the causes of the first to third problems described above is impropriety of factors such as method and conditions of preparation of the compound, molding conditions such as temperature, and post-molding conditions such as cooling condition.

Accordingly, an object of the present invention is to provide a rare earth bonded magnet which has a low porosity and which excels in moldability, mechanical and magnetic characteristics and dimensional stability, and to provide also a method, as well as a composition for rare earth bonded magnet, which enables easy manufacture of such a rare earth bonded magnet.

DISCLOSURE OF THE INVENTION

The present invention provides a method of manufacturing a rare earth bonded magnet formed by binding a rare earth magnetic powder by a binder resin, comprising the steps of:

mixing the magnet powder and the binder resin and kneading the mixture so as to prepare a kneaded material;

granulating or graining the kneaded material to form the kneaded material into a granular material;

conducting pressure molding on the granulated material at a first temperature at which the binder resin is softened or molten; and cooling the molded body while keeping the molded body under pressure at least in the period in which the molded body is cooled down to a second temperature which is below the first temperature.

This method enables production of a rare earth bonded magnet which has a low porosity and which excels in moldability, mechanical characteristics, magnetic characteristics, and dimensional stability. In particular, it is to be noted that these advantageous features are obtainable with reduced amount of the binder resin.

Preferably, the binder resin is a thermoplastic resin.

The use of a thermoplastic resin further offers further improvement in the moldability and further reduction of the porosity.

It is also preferred that the kneading is conducted at a temperature not lower than the thermal deformation temperature of the binder resin, such that the surfaces of the rare earth magnet powder particles are coated with molten or softened binder resin component.

This offers an improvement in the kneading efficiency so as to ensure a more uniform kneading, contributing to the reduction in the porosity.

Preferably, the content of the rare earth magnet powder in the kneaded material ranges from 90 wt % to 99 wt %.

This contributes to improvement in the magnetic characteristics, because the binder resin content in the magnet is reduced correspondingly.

It is also preferred that the kneaded material contains an antioxidant.

The use of an antioxidant suppresses oxidation, degradation and denaturation of the rare earth magnet powder and of the binder resin in the course of the manufacture, thus contributing to the improvement in the magnetic characteristics.

Preferably, the average granule size of the granular material ranges from 0.01 to 2 mm.

This ensures quantitative feed of the material while maintaining low porosity, offering a high degree of dimensional precision of the rare earth bonded magnet.

Preferably, the second temperature is the melting temperature or the thermal deformation temperature of the binder resin.

It is also preferred that the pressure applied to the molded body during cooling under pressure is maintained constant at least in the period until the temperature falls to a temperature between the first and second temperatures.

These features render more remarkable the effects of reduction in the porosity and improvement in the dimensional precision.

The present invention also provides a method of manufacturing a rare earth bonded magnet formed by binding a rare earth magnetic powder by a binder resin, comprising the steps of: preparing a mixture or a kneaded blend of the rare earth magnet powder and the binder resin; granulating or graining the mixture or kneaded blend to form a granular material; and conducting molding by using the granular material.

This method enables manufacture of a rare earth bonded magnet which has a low porosity and which excels in moldability, magnetic characteristic and dimensional stability, i.e., dimensional precision. In particular, it is to be noted that these advantageous effects are obtainable even with reduced amount of the binder resin.

It is preferred that the maximum granule size of the granular material is not greater than the minimum size of the gap in the mold used for the molding.

The maximum granule size of the granular material is preferably not smaller than 0.02 mm.

The average granule size of the granular material preferably ranges from 0.01 mm to 2 mm.

These features offer a further improvement in the dimensional precision of the molded body, while maintaining the reduced porosity.

Preferably, the granulation or the graining is conducted by grinding.

The granulation or the graining can easily be performed by grinding.

Preferably, a heat treatment is conducted subsequent to the molding.

When the binder resin is a thermosetting resin, the heat treatment serves to harden the uncured thermosetting resin, whereas, when the binder resin is a thermoplastic resin, the heat treatment serves to enhance the binding force, whereby the mechanical strength of the product magnet is improved.

The present invention also provides a method of manufacturing a rare earth bonded magnet formed by binding a rare earth magnet powder by a thermoplastic binder resin, comprising the steps of:

pressure-molding a composition containing the rare earth magnet powder and the binding resin at a first temperature at which the binder resin is softened or molten; and cooling the molded body while keeping the molded body under pressure at least in the period in which the molded body is cooled down to a second temperature which is below the first temperature.

The present invention also provides a method of manufacturing a rare earth bonded magnet formed by binding a rare earth magnet powder by a thermoplastic binder resin, comprising the steps of:

kneading a composition containing the rare earth magnet powder and the binding resin at a temperature which is not lower than the thermal deformation temperature of the binder resin;

pressure-molding the kneaded material at a first temperature at which the binder resin is softened or molten; and cooling the molded body while keeping the molded body under pressure at least in the period in which the molded body is cooled down to a second temperature which is below the first temperature.

These methods of the invention enables production of rare earth bonded magnets which have small porosity values and which excel in the moldability, mechanical characteristics, magnetic characteristics and dimensional stability. In particular, it is to be noted that these advantageous features are obtainable even with reduced amount of the binder resin.

Preferably, the second temperature is the melting temperature or the thermal deformation temperature of the binder resin.

It is also preferred that the difference between the first and second temperatures is not smaller than 20° C.

These features render more remarkable the effects of reducing the porosity and improvement in the dimensional precision.

It is also preferred that the cooling under pressure is conducted continuously without releasing the pressure applied during the pressure molding.

It is also preferred that the pressure applied during the cooling under pressure is equal to or lower than the pressure applied during the pressure molding.

It is also preferred that the pressure applied during the cooling under pressure is maintained constant at least in the period in which the temperature comes down to the melting temperature of the binder resin.

The advantages brought about by the cooling under pressure are more effectively offered by these features, achieving further reduction in the porosity and further improvement in the dimensional precision.

Preferably, the rate of cooling under pressure ranges from 0.5° C./sec to 100° C./sec.

Such cooling rate serve to ensure high mechanical strength and high dimensional precision, without impairing production efficiency.

It is also preferred that the pressure applied during the pressure molding is not higher than 60 kgf/mm$^2$.

Such a low pressure reduces burden on the mold and the molding machine, thus facilitating the production.

The present invention also provides a rare earth bonded magnet composition for use in the manufacture of a rare earth bonded magnet formed by binding a rare earth magnet powder by a binder resin, wherein the composition is a granular material of a mixture or kneaded blend of the rare earth magnet powder and the binder resin, having an average granule size ranging from 0.01 mm and 2 mm.

The present invention further provides a rare earth bonded magnet composition for use in pressure molding for the manufacture of a rare earth bonded magnet formed by binding a rare earth magnet powder by a binder resin, wherein the composition is a granular material of a mixture or kneaded blend of the rare earth magnet powder and the binder resin, having the maximum granule size not greater than the minimum size of the gap in the mold used in the pressure molding.

These rare earth bonded magnet composition permit easy manufacture of rare earth bonded magnets which have low levels of porosity and which excel in moldability, mechanical characteristics, magnetic characteristics and dimensional stability. In particular, it is to be noted that these advantageous effects are obtainable even with reduced amount of the binder resin.

Preferably, the maximum granule size of the granular material is not smaller than 0.02 mm.

This effectively suppresses tendency for the porosity to increase.

The present invention further provides a rare earth bonded magnet formed through warm molding, wherein a thermoplastic binder resin softened or molten during the warm molding has been cooled under pressure down to a temperature below the molding temperature so as to solidify to bind a rare earth magnet powder, the magnet having a porosity not greater than 4.5 vol %.

The present invention further provides a rare earth bonded magnet formed through warm molding, wherein a thermoplastic binder resin softened or molten during the warm molding has been cooled under pressure down to a temperature not higher than the thermal deformation temperature or the melting temperature of the binder resin so as to solidify to bind a rare earth magnet powder, the magnet having a porosity not greater than 4.0 vol %.

The present invention still further provides a rare earth bonded magnet formed through warm molding from a granular material prepared through a granulating step, wherein a thermoplastic binder resin softened or molten during the warm molding has been cooled under pressure down to a temperature not higher than the thermal deformation temperature or the melting temperature of the binder resin so as to solidify to bind a rare earth magnet powder, the magnet having a porosity not greater than 4.0 vol %.

These rare earth bonded magnets excel in the moldability, mechanical characteristics, magnetic characteristics and dimensional stability. In particular, it is to be noted that these advantageous effects are obtainable even with reduced amounts of binder resins.

Preferably, the content of the rare earth magnet powder in the magnet ranges from 92.0 wt % to 99.0 wt %.

Such rare earth magnet powder content correspondingly reduces the binder resin content in the magnet, achieving a further improvement in the magnetic characteristics.

The rare earth bonded magnet of the invention, when molded in the absence of magnetic field, preferably exhibits maximum magnetic energy product (BH)max of not lower than 6 MGOe.

It is also preferred that the rare earth bonded magnet of the invention, when molded under the influence of a magnetic field, exhibits maximum magnetic energy product (BH)max of not lower than 12 MGOe.

Such superior magnetic characteristics offer excellent performance of devices such as motors incorporating the rare earth bonded magnets of the present invention.

BEST MODE FOR CARRYING OUT THE INVENTION

A detailed description will now be given of the method of manufacturing a rare earth bonded magnet, rare earth bonded magnet composition and a rare earth bonded magnet.

The method of the present invention for manufacturing a rare earth bonded magnet has the following major steps.

<1> Preparation of Composition as Material of Rare Earth Bonded Magnet

The first step of the process is to prepare a composition which is to be used as the material of a rare earth bonded magnet (this composition will be referred to simply as "composition", hereinafter). The composition is mainly composed of a rare earth magnet powder and a binder resin, and preferably contains an antioxidant. Other additives are also contained as necessitated. These components are mixed together by means of a mixer such as a Henschel mixer or a blender, followed by kneading so as to form a kneaded compound.

A description will be given of each of these components.
1. Rare Earth Magnet Powder It is preferred that the rare earth magnet powder comprises an alloy of a rare earth element and a transition metal. More specifically, the following Samples [1] to [5] are preferred.

[1] A magnetic alloy powder containing, as basic elements,
a rare earth element R which is mainly constituted by Sm and a transition metal which is mainly constituted by Co (referred to as "R—Co type alloy", hereinafter).

[2] A magnetic alloy powder containing, as basic elements, R (R is at least one element which is selected from rare earth elements and which includes Y), a transition metal constituted mainly by Fe, and B (referred to as "R—Fe—B type alloy", hereinafter).

[3] A magnetic alloy powder containing, as basic elements, a rare earth element R which is mainly constituted by Sm, a transition metal which is mainly constituted by Fe and an interstitial element which is mainly N (referred to as "R—Fe—N type alloy", hereinafter).

[4] A magnetic alloy powder containing, as basic elements, R (R is at least one element which is selected from rare earth elements and which includes Y), and a transition metal constituted mainly by Fe, and having magnetic phases on the size of nanometers (referred to as "nanocrystalline magnet", hereinafter).

[5] A mixture of at least two of the compositions [1] to [4] set forth above. Use of such a mixture permits easy achievement of excellent magnetic characteristics by virtue of the combination of advantages offered by different types of magnet powder contained in the mixture.

Typical examples of the R—Co type alloy are $SmCo_5$ and $Sm_2TM_{17}$, wherein TM represents a transition metal constituted mainly by Co.

Typical examples of the R—Fe—B type alloy are Nd—Fe—B alloys, Pr—Fe—B alloys, Nd—Pr—Fe—B alloys, Ce—Nd—Fe—B alloys, Ce—Pr—Nd—Fe—B alloys and other alloys which are obtained by substituting part of Fe of the foregoing alloys with other transition metal such as Co, Ni or the like.

A typical example of the R—Fe—N type alloy is $Sm_2Fe_{17}N_3$ which is prepared by nitriding $Sm_2Fe_{17}$ alloy.

Examples of the rare earth elements in the magnet powder are Y, La, Ce, Pr, Nd, Pm, Sm, Eu, Gd, Tb, Dy, Ho, Er, Tm, Yb, Lu and mish metals. One, two or more of the elements listed above may be contained. Examples of the transition metal are Fe, Co, Ni and the like. One, two or more of these metals may be contained. In order to improve the magnetic characteristic, the magnet powder may contain, as required, an element or elements such as B, Al, Mo, Cu, Ga, Si, Ti, Ta, Zr, Hf, Ag, Zn or the like.

Although not exclusive, the average particle size of the magnet powder preferably ranges from 0.5 to 100 $\mu$m and more preferably from 1 to 50 $\mu$m. The average particle size of the magnet powder can be measured by, for example, F.S.S.S.(Fischer Sub-Sieve Sizer) method.

The particle sizes may be uniform around the average size or may be distributed widely to some extent. Wide particle size distribution is preferred when it is desired to obtain excellent moldability during the molding with the use of reduced amount of binder resin, as will be described later. Such a wide distribution of the particle size provides a reduced porosity of a bonded magnet as the product. In case of the mixture material [5] mentioned before, different kinds of magnet powder as the mixture components may have different average particle sizes.

No restriction is posed on the method of preparing the magnet powder. For instance, magnet powder is prepared by melt casting an alloy ingot, and pulverizing the alloy ingot into an appropriate size, followed by sieving. In an alternative method, a quenched ribbon (micro-fine polycrystalline structure) is formed by means of a quenching ribbon production apparatus of the type which is normally used for production of amorphous alloys, and pulverizing the ribbon into particles of suitable sizes, followed by sieving.

The content of the magnet powder in the composition to be obtained preferably ranges from approximately 90 to 99 wt %, more preferably from approximately 92 to 99 wt % and most preferably from approximately 95 to 99 wt %. A too small magnet powder content hampers improvement in the magnetic characteristics, in particular the maximum magnetic energy product, and tends to deteriorate the dimensional precision. Conversely, a too large magnet powder content causes a reduction in the moldability, due to a consequent increase in the binding resin content.

2. Binder resin

The binder resin may be either a thermoplastic resin or a thermosetting resin. The use of a thermoplastic resin as the binder resin provides an advantage over the use of a thermosetting resin in that the magnet can have a smaller porosity. According to the present invention, a further reduction in the porosity can be achieved, by virtue of the molding temperature condition and cooling condition which will be described later.

Examples of usable thermoplastic resins include polyamide resins (e.g., nylon 6, nylon 46, nylon 66, nylon 610, nylon 612, nylon 11, nylon 12, nylon 6-12 and nylon 6-66); liquid crystal polymers such as thermoplastic polyimide resins and aromatic polyester resins; polyphenylene oxide resins; polyphenylene sulfide resins; polyolefin resins such as polyethylene resins, polypropylene resins and ethylene-vinyl acetate copolymers; modified polyolefin resins; polyether resins; polyacetal resins; and copolymers, mixtures, and polymer alloys of the foregoing resins. One of these resins is used alone or two or more of these resins are used in the form of a mixture.

Among these resins, polyamide resins or their copolymers are preferably used from the view points of moldability and mechanical strength, materials mainly constituted by liquid crystal polymers and polyphenylene sulfides are used from the view point of heat resistance, and materials mainly constituted by polyolefins are preferably used from the view points of ease of molding and economy. These resins also exhibit superior kneadability with the magnet powder.

Preferably, the thermoplastic resin has a melting point of 120° C. or higher, more preferably from 122° C. to 400° C. and most preferably from 125° C. to 350° C. A melting point below the lower limit of the range specified above degrades the heat resistance of the molded magnet, making it difficult to obtain required levels of temperature characteristics (magnetic or mechanical). Conversely, a melting point exceeding the upper limit of the range specified above requires elevated molding temperature, tending to allow oxidation of the magnet powder.

In order to further improve the moldability, the thermoplastic used in the invention preferably has an average molecular weight (polymerization degree) of from approximately 1000 to approximately 60000, more preferably from approximately 12000 to 35000.

Examples of thermosetting resins suitably used are epoxy resins; phenol resins; urea resins; melamine resins; polyester resins (unsaturated polyester resins); polyether resins (e.g., polyether nitrile); polyurethane resins; and so forth. One of these resins may be used alone or two or more of them may be used in the form of a mixture.

Among these resins, epoxy resins and phenol resins, in particular epoxy resins, are preferably used because they provide remarkable improvement in moldability, as well as superior mechanical strength. These thermoplastic resins excel also in the kneadability with magnet powder.

The thermosetting resins, when used, are added in a state in which they have not yet been hardened, and may be in solid (powdered), liquid or semi-liquid phase at room temperature.

The content of the binding resin in the composition preferably ranges from approximately 1 wt % to approximately 10 wt %, more preferably from approximately 1 wt % to approximately 8 wt %, and most preferably from approximately 1 wt % to approximately 5 wt %. A too large content of the binder resin does not contribute to improvement in the magnetic characteristics (in particular, maximum magnetic energy product) but, rather, tends to deteriorate the dimensional precision. Conversely, a too small binder resin content impairs moldability.

3. Antioxidant

Antioxidant is an additive which is employed in the preparation of the composition of the present invention for the purpose of preventing oxidation deterioration of the rare earth magnet powder and denaturation of the same due to oxidation of the binder resin (this denaturation occurs as a result of catalytic action of the metallic components of the rare earth magnetic powder). The addition of the antioxidant is effective in preventing oxidation of the rare earth magnet powder and contributes to improvement in the magnetic characteristic of the magnet, as well as to improvement in the thermal stability of the composition under kneading and molding. Thus, the antioxidant plays an important role of ensuring good moldability with reduced amount of the binder resin.

The antioxidant tends to be lost by evaporation or denaturated during kneading and molding into a magnet, only part of the antioxidant added remains and exists in the rare earth bonded magnet as the product.

Any type of anti-oxidant which can prevent or suppress oxidation of the rare earth magnet powder may be used. For instance, suitably used are chelating agents which form chelate compounds with the metallic ions, in particular Fe ions, such as amine type compounds, amino-acid type compounds, nitrocarboxylic acid type compounds, hydrazine type compounds, cyanide type compounds, sulfide type compounds and so forth. Obviously, antioxidants mentioned above are only illustrative and antioxidants of other types and compositions than those listed above may be used.

The content of the antioxidant when it is used in the composition preferably ranges from approximately 0.1 wt % to approximately 2 wt %, more preferably from approximately 0.5 wt % to 1.5 wt %. At the same time, the ratio of the antioxidant content to the binder resin content preferably ranges from approximately 2 percent to approximately 150 percent, more preferably from approximately 30 percent to approximately 100%.

In the present invention, the degree of oxidation of the magnet powder, as well as the degree of denaturation of the same due to oxidation of the binder resin, is ruled by the ratio of the content between the magnet powder and the binder resin. Needless to say, therefore, the composition of the invention may have an antioxidant content which falls below the range set forth above or may even be completely devoid of such antioxidant.

The contents of the binder resin and the antioxidant are determined taking into account, for example, the following factors.

A comparatively small binder resin content causes the magnet powder content to increase correspondingly, so that the viscosity of the mixture under kneading is enhanced to require a greater kneading torque, resulting in enhanced generation of heat and resultant promotion of oxidation. If the content of the antioxidant is small, oxidation of the resin cannot be sufficiently suppressed, which serves to increase the viscosity of the material under kneading (molten resin), with the results that the kneadability and moldability are impaired to hamper production of magnets which have low porosity and which excel in mechanical strength and dimensional stability. In contrast, when the content of the antioxidant is comparatively large, the binder resin content decreases correspondingly, tending to reduce the mechanical strength of the molded green body.

Conversely, a greater binder resin content correspondingly decreases the content of the magnet powder, which in turn reduces the influence of the magnetic powder on the resin, thus suppressing oxidation tendency of the resin. it is therefore possible to suppress oxidation of the resin even with reduced amount of the antioxidant.

Thus, a comparatively large content of the binder resin permit a reduction in the content of the antioxidant, whereas a smaller binder resin content requires the use of a greater amount of antioxidant.

Thus, the total content of the binder resin and the antioxidant in the composition preferably ranges from 1.0 wt % to 8.0 wt %, more preferably from 2.0 wt % to 6.0 wt %. A total content falling within the range specified above contributes to improvement in the moldability and to enhancement of the anti-oxidation effect, thus offering advantages in the production of magnets having low porosity and excellent both in mechanical strength and magnetic characteristics.

4. Other additives

The composition may contain, as necessitated, other type or types of additives such as a plasticizer (e.g., aliphatic acid salt such as zinc stearate, and aliphatic acid such as oleic acid), a lubricant (e.g., silicone oil, wax, aliphatic acid, and inorganic lubricant such as alumina, silica and titania), a hardening agent, a hardening assistant, and other molding assistants.

Addition of the plasticizer improves fluidity during the molding, so that desired characteristics can be achieved with the use of a reduced amount of binder resin. In addition, pressure molding can be carried out with a lower compacting pressure. These advantages are also obtainable through the use of a lubricant. Preferably, the content of the plasticizer is from approximately 0.01 wt % to approximately 0.2 wt %, while the content of lubricant is preferably from approximately 0.05 wt % to approximately 0.5 wt %.

The rare earth magnet powder and the binder resin, preferably together with an antioxidant and together with other additives as required, are mixed to form a mixture which is used as the magnet molding composition. The mixing is conducted by using, for example, a mixer such as a Henschel mixer, or a blender.

Preferably, the mixture is further kneaded to form a kneaded material which is used as the magnet molding composition. Such kneading may be performed by, for example, a twin-screw extrusion kneader, a roll-type kneader, or an ordinary kneader.

The kneading may be conducted at a room temperature but is preferably conducted at a temperature not lower than the thermal deformation temperature of the binder resin (measured by method specified by ASTM D648) or not lower than the softening point of the same, more preferably not lower than the melting point of the binder resin.

For instance, when a polyamide resin (thermal deformation temperature 145° C., melting point 178° C.) is used as the binder resin, kneading temperature specifically preferred is from approximately 150° C. to approximately 280° C., whereas, when a phenol novolak resin (softening point 80° C.) is used, specifically preferred kneading temperature is from approximately 80° C. to approximately 150° C.

The kneading time varies according to conditions such as the kind of the binder resin, type of the kneader used and the kneading temperature. Usually, however, the kneading time preferably is from about 3 minutes to about 120 minutes, more preferably from about 5 minutes to about 40 minutes.

The kneading should be conducted sufficiently to obtain such a state that the surface of the powder particle of the rare earth magnet powder is coated with the molten or softened binder resin component. In order to obtain the above-mentioned state, when kneading is conducted at a temperature falling within the range specified above, the kneading time preferably ranges from approximately 5 minutes to 90 minutes, more preferably from approximately 5 minutes to 60 minutes, although the kneading time may vary according to factors such as the kind of the binder resin, type of the kneading machine used and the kneading temperature.

The described kneading conditions serve to improve kneading efficiency and permits uniform kneading in a shorter time than that required when the kneading is conducted at room temperature. At the same time, since a comparatively low viscosity of the binder resin is maintained during the kneading, the particles of the rare earth magnet powder are uniformly coated by the binder resin. This contributes to a reduction in the porosity of the composition and, hence, the porosity in the magnet as the product.

When n types of thermoplastic resins (n being an integer) are used in the form of a mixture, the aforesaid "thermal deformation temperature (or melting point) of the binder resin used" can be determined through the following calculation.

It is assumed that the total amount of the thermoplastic resins is one weight part. Amounts of the respective thermoplastic resins are expressed by $A_1, A_2, \ldots, A_n$, respectively, while the thermal deformation temperatures (or melting points) of the respective thermoplastic resins are expressed by $T_1, T_2, \ldots, T_n$. The thermal deformation temperature (or melting point) of the thermoplastic resin mixture is given by $A_1T_1+A_2T_2+\ldots A_nTn$. This calculation method applies also to the cases where n types of thermoplastic resins are used in the form of a mixture.

<2> Preparation of granules

The mixture or kneaded composition prepared through composition preparation step <1> described above is then granulated or pelletized so as to become granules of a predetermined grain size.

Although no restriction is posed on the method of granulation or pelletizing, the granulation or pelletizing is preferably conducted by crushing the kneaded composition. The crushing may be effected by, for example, a ball mill, a vibration mill, a breaker, a jet mill or a pin mill.

The granules also may be prepared by using an extrusion pelletizer or even by a combination of the pelletizing and crushing.

The grain size of the granules may be regulated through classification by means of, for example, a sieve.

A description will now be given of the suitable size of the granules.

Preferably, the maximum size of the granules is not greater than the minimum size of the mold gap (space to be filled with the granules). Specifically, the maximum size of the granules is not smaller than 0.02 mm, preferably not smaller than 0.05 mm. Maximum granule size exceeding the mold gap hinders the filling of the mold with the granules or makes it difficult to control the amount of the granules to be charged, thus hampering improvement in the dimensional precision of the bonded magnet. Conversely, a too small maximum size of the granules tends to increase the porosity of the bonded magnet as the product.

Preferably, the granules have an average size of from approximately 0.01 mm to approximately 2 mm, more preferably from approximately 0.02 mm to approximately 2 mm, and most preferably from approximately 0.05 mm to approximately 2 mm. Average granule size exceeding 2 mm makes it difficult to delicately control the amount of the granules charged in the mold, thus impairing quantitative control, failing to achieve aimed improvement in the dimensional precision, particularly when the dimensions of the magnet to be manufactured are small, i.e., when the size of the mold gap is small. On the other hand, granules of an average size less than 0.01 mm are not easy to prepare or requires a troublesome work in the preparation. In addition, a too small average granule size tends to increase the porosity of the bonded magnet as the product.

The granule size is preferably uniform, although it may have a distribution to some extent. Such a uniform granule size enhances the packing density in the mold, leading to low porosity and high dimensional precision of the product bonded magnet.

<3> Pressure Molding

Pressure molding is performed on the rare earth bonded magnet composition, in particular the granules prepared in the preceding step <2> of preparing granules. A description will now be given of a pressure molding which is a representative example of the pressure molding.

A predetermined amount of granules of the rare earth bonded magnet composition, obtained through a volumetric measurement such as, for example, grading method (a method in which a powder-like material is charged in a vessel by gravity and any surplus material protruding above the top of the vessel is scraped off) or through weighing, is charged in a mold gap of a pressure molding machine.

The granular material thus charged in the mold is then molded by pressure with or without application of an aligning magnetic field. (The aligning magnetic field intensity may be, for example, from 5 to 20 KOe, and the aligning direction may be longitudinal, transverse or radial.) The pressure molding may be cold molding (molding at or around room temperature), low-temperature warm molding (molding conducted by heating the composition to a temperature below the softening point of the binder resin), or warm molding, although warm molding is preferred. Namely, suitable treatment such as heating of the mold is conducted so as to elevate the temperature of the material under molding to a predetermined temperature (referred to as "first temperature", hereinafter) at which the binder resin, specifically a thermoplastic resin, is softened or molten.

Thus, the first temperature is a temperature which is not lower than the thermal deformation temperature or not lower than the softening temperature of the binder resin used. More specifically, when the binder resin used is a thermoplastic resin, the first temperature is preferably not lower than the melting temperature of the resin, more preferably it ranges from the melting temperature to the temperature which is 200° C. above the melting temperature, and most preferably from the melting temperature to the temperature which is 130° C. above the melting temperature.

For instance, when the thermoplastic resin used is a polyamide resin (melting temperature 178° C.), the preferred material temperature under the molding, i.e., the first temperature, should range from about 180° C. to about 300° C. In contrast, when the binder resin used is phenol novolak resin (softening temperature 80° C.) which is a thermosetting resin, the first temperature preferably falls within the range of from 80° C. to 280° C.

Pressure molding, when conducted at such a temperature, ensured high fluidity of the material under molding, thus enabling mass-production of magnets having low porosity, high mechanical strength and high degrees of shape and dimensional stability, even when the magnet is of a shape having thin-walled portion, e.g., ring-shape, tabular shape or curved tabular shape, and even when the magnet is small in size or elongated, not to mention ordinary cylindrical or block shape.

The compacting pressure employed in the pressure molding is preferably 60 kgf/mm$^2$ or less, more preferably from approximately 2 kgf/mm$^2$ to approximately 50 kgf/mm$^2$, and most preferably from approximately 5 kgf/mm$^2$ to approximately 40 kgf/mm$^2$. According to the present invention, it is possible to shape and mold bonded magnets having foregoing advantageous features, even at such comparatively low levels of molding pressure, by virtue of the fact that the molding is conducted at the first temperature set forth above.

Such low levels of molding pressure correspondingly reduces loads on the mold and the molding machine, eliminating necessity of use of mold and molding machines having greater size and power, while extending the lives of the same, thus offering an advantage in the manufacturing process.

When the pressure molding is carried out by cold molding technique, the molding pressure preferably ranges from approximately 20 kgf/mm$^2$ to approximately 100 kgf/mm$^2$, and more preferably from approximately 30 kgf/mm$^2$ to approximately 70 kgf/mm$^2$.

<4> Cooling

When the pressure molding is warm molding, the molded body should be cooled. Preferably, the cooling is conducted down to a predetermined temperature (referred to as "second temperature") which is below the first temperature, while keeping the molded body under a pressure. This cooling step, therefore, will be referred to as "cooling under pressure", hereinafter.

Such cooling under pressure maintains the low porosity established in the course of the molding without change, thus ensuring low porosity, high dimensional stability and superior magnetic characteristics of the rare earth bonded magnet as the product.

In order to achieve low porosity and high dimensional stability of the product bonded magnet, it is preferred that the second temperature (pressure releasing temperature) is set to be low as possible. According to the present invention, the second pressure is preferably not higher than the meting temperature of the binder resin (specifically thermoplastic resin), and more preferably not higher than the thermal deformation temperature (softening temperature) of the resin used as the binder resin.

Preferably, the difference between the first temperature and the second temperature is 20° C. or greater, more preferably 50° C. or greater. The greater the difference, the greater the effects in reducing porosity and enhancing dimensional precision.

A comparatively large magnet powder content in the composition permits easier production of low-porosity bonded magnet, even if the second temperature is set to a comparatively high level. For instance, when the magnet powder content in the kneaded material is 94% or greater, it is possible to obtain a low porosity (not greater than 4.5% or not greater than 4.0%), even when the second temperature is set to a temperature around the melting point or a temperature which is about 10° C. higher than the melting temperature of the binder resin.

The cooling under pressure may be executed after a temporal dismissal or reduction of the pressure from the molding pressure. For the purpose of simplification of the process and improvement in the dimensional precision, however, it is preferred that the cooling is conducted without dismissing the molding pressure.

The pressure may be changed during the cooling. It is, however, preferred that the pressure is maintained constant at least in the period in which the temperature falls from the first temperature to the second temperature. More preferably, the pressure is maintained constant at least in the period in which the material temperature falls down to the melting temperature, still more particularly down to the thermal deformation temperature, of the resin used as the binder resin. Such control of the pressure offers a remarkable effect in the reduction of the porosity and enhancement of the dimensional precision.

The change of the pressure during the cooling may be controlled in accordance with such a pattern that the pressure increases or decreases linearly or stepwise.

The pressure (average pressure when the pressure changes by time) applied during the cooling under pressure should be equal to or below the molding pressure applied during the pressure molding. More preferably, the same level of pressure as the molding pressure is maintained at the shortest until the temperature comes down to the melting temperature of the binder resin. When any pressure is applied in the period in which the material cools from the melting temperature to the thermal deformation temperature of the binder resin, the pressure in such a period is preferably set to range from approximately 40% to approximately 100%, more preferably from approximately 50% to 80% of the molding pressure. The effects of reducing porosity and enhancing dimensional precision are rendered more remarkable by the described control of pressure.

Needless to say, the present invention does not exclude continuation of the cooling without application of pressure, i.e., under normal atmospheric pressure, subsequent to the cooling under pressure, i.e., after the release of the pressure. It is also possible to conduct, subsequent to the cooling without application of pressure, a later-mentioned heat treatment, followed by another cooling under pressure.

There is no restriction in the cooling rate (average cooling rate when the rate changes by time) during the cooling under pressure. The cooling rate, however, ranges preferably from 0.5° C./sec to 100° C./sec, more preferably from 1° C./sec to 80° C./sec. A too high cooling rate involves a risk of fine cracking in the molded body due to rapid contraction caused by the quick cooling, resulting in a reduction of the mechanical strength. Too quick cooling also enhances the internal stress which, when the molded body is removed from the mold, causes distortion or deformation of the body due to relaxation of the stress, leading to an inferior dimensional precision. Conversely, a too low cooling rate prolongs the cycle time, resulting in a reduction of the productivity.

The rate of cooling after release of the pressure, if such cooling is conducted, may be done at any desired rate. Thus, the foregoing ranges of the cooling rate may apply to such cooling conducted after release of the pressure.

The rate of cooling under pressure, as well as the rate of cooling executed after release of pressure, may be constant or varied in relation to time.

The cooling may be effected by any suitable method such as natural cooling, forced air cooling, water cooling, oil cooling, or a combination of water cooling and air cooling.

<Heat Treatment>

The cooling step <4> described above need not be executed when the molding in the foregoing step <3> is conducted by cold molding. In such a case, the molded body is subjected as required to a heat treatment (baking). Such a heat treatment may also be conducted after warm molding or low-temperature warm molding or after the cooling subsequent to such molding.

The primary purpose of the heat treatment is to thermally cure the binder resin when the latter is a thermosetting resin, while the secondary purpose is to soften or melt the binder resin so as to enhance the bonding force thereby increasing the mechanical strength.

The heat treatment intended for the primary purpose is to heat the thermosetting binder resin to a temperature not lower than the hardening temperature, and requires a comparatively long heating time of, for example, from 30 minutes to 4 hours.

The heat treatment intended for the secondary purpose may be executed to produce appreciable effect not only when the pressure molding is carried out as cold molding but also when the same is conducted by warm molding or low-temperature warm molding. This heat treatment is conducted by heating the binder resin to a temperature not lower than the softening temperature, preferably not lower than the melting temperature, and the heating time may be as short as from, for example, one to 30 minutes or so.

This heat-treating step may be executed in an overlap with the foregoing step <3> or subsequent to the step <3>, or even after the cooling step <4>.

Obviously, the invention does not exclude any heat treatment which is intended for purposes other than the foregoing primary and secondary purposes.

The rare earth bonded magnets of the present invention, manufactured by the method as described, exhibit the following excellent characteristics. More specifically, according to the invention, the rare earth bonded magnet of the present invention can have a low porosity, preferably 4.5 vol % or less, more preferably 4.0 vol % or less and most preferably 3.0 vol % or less. Such low porosity, i.e., high density, offers greater mechanical strength, as well as improved corrosion resistance, and provides a high dimensional precision which ensured reduced fluctuation of dimensions, thus realizing superior dimensional stability.

The rare earth bonded magnet in accordance with the present invention also excels in the magnetic characteristics. Even isotropic magnets exhibit superior magnetic characteristics by virtue of the composition of the magnet powder and the large content of the magnet powder.

The content of the rare earth magnet powder in the rare earth bonded magnet of the present invention ranges preferably from approximately 92 wt % to approximately 99 wt %, more preferably from approximately 94 wt % to approximately 99 wt %, and most preferably from approximately 94 wt % to approximately 99 wt %. A too small content of the magnet powder does not contribute to improvement in the magnetic characteristic (in particular maximum magnetic energy product) and tends to impair the dimensional precision. Conversely, a too large content of the magnet powder causes the binder resin content to decrease correspondingly, resulting in an inferior moldability.

The rare earth bonded magnet of the invention, when manufactured without magnetic field, preferably possesses maximum magnetic energy product (BH)max of 6 MGOe or greater, more preferably 8 MGOe or greater. When manufactured under the influence of a magnetic field, the magnet possesses maximum magnetic energy product (BH)max of 12 MGOe or greater, more preferably 13 MGOe or greater. The rare earth bonded magnet of the present invention, which has the superior magnetic characteristics and high dimensional precision as described, offers excellent performance of a device such as a motor incorporating this magnet.

No restriction is posed in regard to the shape and dimensions of the rare earth bonded magnet of the present invention. Thus, the magnet can have any desired shape or configuration such as cylindrical shape, polygonal columnar shape, tubulAr shape, arcuate shape, flat tabular shape or curved tabular shape. The size may vary from large to small. Furthermore, there is no limitation in the purpose of use of the rare earth bonded magnet of the present invention.

Examples of the present invention will now be described.

EXAMPLE 1

The following magnet powder, binder resin (thermoplastic resin) and additive were mixed together to form a mixture which was subjected to kneading, and the kneaded matter was granulated (grained) into granules. The granular material was charged in a mold of a molding machine and was pressure-molded (warm molding) without application of magnetic field. After the molding, cooling was executed while maintaining the same level of pressure as the molding pressure, whereby Sample Nos. 1a to 9a of rare earth bonded magnets, having magnet powder particles bonded together by the solidified binder resin, were obtained. The amounts of the matters shown below are expressed in terms of the contents in the kneaded composition.

Composition
  Nd—Fe—B type magnet powder:
  $Nd_{12.0}Fe_{77.8}Co_{4.3}B_{5.9}$
  96.0 wt % (content in product magnet is almost the same as this value)
  Thermoplastic resin:
  Each of resins A to G shown in Table 1, 2.8 wt %
  Antioxidant: hydrazine-type antioxidant, 1.2 wt %
  Mixing: Mixed by means of Henschel mixer
  Kneading: Kneaded by a twin-screw kneader at temperatures shown in Table 2. Screw speed 100 to 300 r.p.m., kneading time (time of stay in the kneader) 5 to 15 minutes
  Granulation (Graining):
    Kneaded composition was granulated into granules of average size of 0.8 mm, though grinding and classification.
  Molding: Granulated material was charged into a mold at room temperature, and pressure-molded when temperature has been raised to a predetermined molding temperature (first temperature). As to molding temperature and molding pressure, reference be made to Table 2.
  Cooling: The molded body was cooled down to a predetermined pressure releasing temperature (second temperature) while the pressure was maintained. After the release of the pressure, cooling was continued down to the room temperature. Samples were thus obtained and removed from the molds. As to the pressure releasing temperature, reference be made to Table 2. The cooling rate in the cooling under pressure was 1° C./sec.
  Product shapes:
    Cylindrical shape (outside diameter 30 mm×inside diameter 28 mm×height 7 mm)
    Flat tabular shape (20 mm wide×20 mm long×3 mm thick) (For use as a mechanical strength test piece)
  The values of the thermal deformation temperature appearing in Table 1 were those obtained through measurement conducted in accordance with ASTM D 648 set forth below.
  ASTM D648: A test piece in an oil bath is supported at its both ends and loaded at its center by a loading bar so as to have a bending stress of 4.6 kgf/cm$^2$.

Oil temperature is raised at a rate of 2° C./minute, and the temperature at which the deflection reaches 0.254 mm is measured.

Magnetic performance (magnetic flux density Br, coercive force iHc, maximum magnetic energy product (BH) max), as well as density, porosity, mechanical strength and corrosion resistance were examined with the samples of the rare earth bonded magnet thus obtained. The results are shown in Table 3.

The items of evaluation appearing in Table 3 were measured in accordance with the following methods.

Magnetic performance:
Each sample was magnetized by 40 KOe pulse and subjected to measurement by a D.C. magnetometer under application of maximum magnetic field of 25 KOe. Alternatively, magnet piece of 5 mm square and 1 mm thick was cut out of each sample and was subjected to measurement by a vibration specimen magnetometer (VSM).

Density:
Density was measured in accordance with Archimedean method (submerging method).

Porosity:
Porosity was calculated from the weighed composition and the measured density of the molded body.

Mechanical strength:
Mechanical strength was measured through punching shearing test. A machine named autograph, manufactured by Shimadzu Corporation, was used as the testing machine. The test was conducted at a shearing rate of 1.0 mm/min, by using a circular punch 3 mm diameter. Flat tabular magnet was used as the test piece.

Corrosion resistance:
Molded magnet was placed in a thermo-humidistat oven maintaining an atmosphere of 80° C. and 90% humidity, and the time until rust is generated was measured. The sample magnets were taken out of the oven at every 50 hours for the observation of their surfaces with an optical microscope (magnification 10). After elapse of 500 hours, the observation interval was changed to 500 hours.

As will be clear from Table 3, Sample Nos. 1a to 9a of the rare earth bonded magnet of the present invention, manufactured by using a thermoplastic resin as the binder resin, have porosity values as small as 1% or less, despite the low molding pressure employed in the molding. Thus, the bonded magnet in accordance with the invention has a high density which approximates stoichiometric density and, accordingly, an extremely high mechanical strength.

Furthermore, these samples of the bonded magnet showed sufficiently high corrosion resistance, even with no coating thereon. This is considered to be attributed to small porosity which ensures that the binder resin uniformly covers the magnet powder particles.

Sample Nos. 1a to 9a of the bonded magnet were cut and the cut surfaces were observed through electron-microscopic photography (S EM). The cut surface of each sample showed almost no pore, and it was confirmed also that the binder resin was uniformly distributed around the particles of the magnet powder particles.

It will also be seen that the samples of the bonded magnet of the invention exhibits high levels of magnetic flux density Br, coercive force iHc and maximum magnetic energy product (BH)max, thus demonstrating excellent magnetic characteristics.

EXAMPLE 2

The following magnet powder and binder resin (thermosetting resin) were mixed together to form a mixture which was subjected to kneading, and the kneaded matter was granulated (grained) into granules. The granular material was charged in a mold of a molding machine at the room temperature and was pressure-molded (cold or warm molding) without application of magnetic field. After the molding, binding resin was hardened, whereby Sample Nos. 10a to 15a of rare earth bonded magnets were obtained. The amounts of the matters shown below are expressed in terms of the contents in the kneaded composition.

Composition
Nd—Fe—B type magnet powder:
$Nd_{12.0}Fe_{77.8}CO_{4.3}B_{5.9}$
96.0 wt % (content in product magnet is almost the same as this value)

Thermosetting resin:
Each of resins shown in Table 4
4.0 wt % (inclusive of hardening agent)

Mixing:
Mixed by means of a twin-cylinder mixer when the binder resin used was solid at room temperature. A blender was used when the binder resin was in liquid phase at the room temperature.

Kneading:
Kneaded by a kneader at temperatures shown in Table 5. Screw speed 50 to 250 r.p.m., kneading time 30 minutes Granulation (Graining):
Kneaded composition was granulated into granules of average size of 0.8 mm or smaller, through grinding and classification.

Molding:
Granulated material was charged into a mold at room temperature, and pressure-molded at a predetermined molding temperature. As to molding temperature and molding pressure, reference be made to Table 5.

Cooling:
The molded body was cooled down to a predetermined pressure releasing temperature and, after release of the pressure further cooled c down to the room temperature except for Sample Nos. 10a and 11a. Samples were thus obtained and removed from the molds. The cooling was conducted by air cooling. As to the pressure releasing temperature, reference be made to Table 5. The cooling rate was 2° C./sec.

Heat treatment:
The tentative molded samples were placed in a thermostat oven, for the purpose of hardening the thermosetting resin. As to the hardening conditions, refer to Table 4.

Product shapes:
Cylindrical shape (outside diameter 30 mm×inside diameter 28 mm×height 7 mm)
Flat tabular shape (20 mm wide×20 mm long×3 mm thick) (For use as a mechanical strength test piece)

Surface treatment:
A 10 μm thick coating of epoxy resin was formed by spraying on each sample of the molded bodies to be subjected to a corrosion resistance test.

Magnetic performance (maximum magnetic energy product (BH)max), as well as density, porosity, mechanical strength and corrosion resistance were examined with the samples of the rare earth bonded magnet thus obtained. The results are shown in Table 6. The method of evaluation of each item is the same as that in Example 1.

Sample Nos. 10a to 15a of the bonded magnet were cut and the cut surfaces were observed through electron-microscopic photography. It was confirmed also that the binder resin was uniformly distributed around the particles of the magnet powder particles, although not few pores were observed in the core of the magnet.

It will be seen from Tables 5 and 6 that the rare earth bonded magnet (in particular Sample Nos. 10a to 15a), manufactured by using thermosetting binder resins, requires higher levels of compacting pressure than those employed in the manufacture of the magnet using thermoplastic binder resins and exhibits correspondingly increased porosity. The increased porosity, however, is still as small as from 5 to 6% or so.

As to the corrosion resistance test, although the samples required a surface treatment, such a surface treatment may be light one, i.e., only a thin coating film had to be formed, and the samples showed extremely excellent corrosion resistance even with such light surface treatment. This is attributable to the small porosity, as well as to the uniform distribution of the binder resin around the particles of the magnet powder as confirmed through the SEM observation. Namely, the magnet powder particles are uniformly coated with the binder resin which also serves to increase adhesion of the magnet powder particles. Since the degree of the required surface treatment is not substantial, high dimensional precision is maintained on the whole magnet as the product.

EXAMPLE 3

The following magnet powder, binder resin (thermoplastic resin) and additive were mixed together to form a mixture which was subjected to kneading, and the kneaded matter was granulated (grained) into granules. The granular material was charged in a mold of a molding machine and was pressure-molded (warm molding) under influence of a magnetic field. After the molding, cooling was executed while maintaining the same level of pressure as the molding pressure, whereby Sample Nos. 16a to 19a of rare earth bonded magnets were obtained. The amounts of the matters shown below are expressed in terms of the contents in the kneaded composition.

Composition

Sm—Co type magnet powder:

$Sm(Co_{bal.}Fe_{0.32}Cu_{0.6}Zr_{0.016})_{7.8}$ 95.0 wt % (content in product magnet is almost the same as this value)

Thermoplastic resin: PPS resin, 4.2 wt %

Antioxidant: hydrazine-type antioxidant, 0.8 wt %

Mixing: Mixed by means of twin-cylinder mixer

Kneading: Kneaded by using various types of kneading machines. As to kneading conditions, refer to Table 7.

Granulation (Graining):

Kneaded composition was granulated into granules of average size of 0.8 mm, through grinding and classification.

Molding:

Granulated material was charged into a mold at room temperature, and pressure-molded under the influence of a transverse magnetic field (15 KOe) when temperature has been raised to a predetermined molding temperature (first temperature). The molding temperature was 320° C., while the molding pressure was 20 kgf/mm².

Cooling:

The molded body was cooled down to a predetermined pressure releasing temperature (second temperature) which was 150° C. while the pressure was maintained. After the release of the pressure, cooling was continued down to the room temperature. Samples were removed from the molds after demagnetization. The cooling was conducted by air cooling. The cooling rate in the cooling under pressure was 5° C./sec.

Product shapes:

Rectangular parallelopiped (11 mm long×8 mm wide×7 mm high, aligned in heightwise direction)

Flat tabular shape (20 mm wide×20 mm long×3 mm thick) (For use as a mechanical strength test piece)

Magnetic performance (maximum magnetic energy product (BH)max), as well as density, porosity, mechanical strength and corrosion resistance were examined with the samples of the rare earth magnet powder thus obtained. The results are shown in Table 8. Methods of evaluations of the items are the same as those in Example 1.

As will be clear from Table 8, Sample Nos. 16a to 19a of the rare earth bonded magnet of the present invention have porosity values as small as 1% or less. Thus, the bonded magnet in accordance with the invention has a high density and, accordingly, high levels of mechanical strength and corrosion resistance.

Furthermore, Sample Nos. 16a to 19a were subjected to SEM observation similar to those of preceding Examples. Almost no pore was observed, and it was confirmed also that the binder resin was uniformly distributed around the particles of the magnet powder particles.

it is also understood that the maximum magnetic energy product (BH)max is large, thus demonstrating superior magnetic characteristics.

COMPARATIVE EXAMPLE 1

The following magnet powder, binder resin (thermoplastic resin) and additive were mixed together to form a mixture which was then charged in a mold of a molding machine and was pressure-molded (warm molding) under influence of a magnetic field. After the molding, cooling was executed without applying pressure, whereby Sample Nos. 20a and 21a of rare earth bonded magnets were obtained. The amounts of the matters shown below are expressed in terms of the contents in the mixture.

Composition

Sm—Co type magnet powder:

$Sm(Co_{bal.}Fe_{0.32}Cu_{0.06}Zr_{0.016})_{7.8}$ 95.0 wt % (Sample No. 20a)

96.0 wt % (Sample No. 21a)

Thermoplastic resin:

PPS resin 4.2 wt % (Sample No. 20a)

3.2 wt % (Sample No. 21a)

Antioxidant: hydrazine-type antioxidant 0.8 wt %

Mixing: Mixed by means of twin-cylinder mixer

Molding:

The mixture was charged into a mold at room temperature, and pressure-molded under the influence of a transverse magnetic field (15 KOe) when temperature has been raised to a predetermined molding temperature. The molding temperature was 320° C., while the molding pressure was 20 kgf/mm².

Cooling:

The molded body was demagnetized in the mold and was taken out of the mold, followed by cooled down to normal temperature under atmospheric pressure. The cooling was conducted by air cooling. The cooling rate in the cooling under pressure was 5° C./sec.

Product shapes:
 Rectangular parallelopiped (11 mm long×8 mm wide×7 mm high, aligned in heightwise direction)
 Flat tabular shape (20 mm wide×20 mm long×3 mm thick) (For use as a mechanical strength test piece)

Sample Nos. 20a and 21 a of the magnet could not be formed into the desired shapes due to recession of the molded body and breakage of edges of the same, caused by deposition of the edge and end surfaces of the molded body to the punch of the molding machine, as a result of leakage of the resin during the molding.

SEM observation of the molded bodies showed non-uniform distribution of the binder resin, allowing mixing of discrete magnet powder and binding resin. Many pores were also observed.

Both Sample Nos. 20a and 21a were defective as stated above, and could not effectively be subjected to measurement of characteristics such as mechanical strength.

COMPARATIVE EXAMPLE 2

The following magnet powder, binder resin (thermosetting resin) and additive were mixed together to form a mixture which was then charged in a mold of a molding machine and was pressure-molded (cold molding) under influence of a magnetic field. After the molding, the resin was hardened, whereby Sample No. 22a of rare earth bonded magnets was obtained. The amounts of the matters shown below are expressed in terms of the contents in the mixture.

Composition
 Sm—Co type magnet powder:
 $Sm(Co_{bal.}Fe_{0.32}Cu_{0.06}Zr_{0.016})_{7.8}$
 96.0 wt %
 Thermosetting resin:
 Bisphenol A novolak resin (melting temperature 60° C.)
 3.6 wt % (inclusive of hardening agent)
 Antioxidant: Hydrazine-type antioxidant 0.4 wt %
 Mixing: Mixed by means of twin-cylinder mixer
 Molding:
  The mixture was charged into a mold at room temperature, and pressure-molded under the influence of a transverse magnetic field (15 KOe).
  The molding was conducted at the room temperature, while the molding pressure was 20 kgf/mm².
 Heat treatment:
  The molded body was demagnetized in the mold and then taken out of the mold. The molded body was then subjected to a heat treatment conducted at 170° C. for 4 hours, so as to harden the thermosetting resin.
 Product shapes:
  Rectangular parallelopiped (11 mm long×8 mm wide×7 mm high, aligned in heightwise direction)
  Flat tabular shape (20 mm wide×20 mm long×3 mm thick) (For use as a mechanical strength test piece)

Sample No. 22a of the magnet could not be formed into the desired shapes due to dropping of the magnet powder, recession of the molded body and breakage of edges of the same. This is attributed to small bonding force between magnet powder particles, insufficient distribution of the binder resin and presence of residual magnetic flux in the powder even after demagnetization although the intensity is low, as a result of the molding conducted on the mixture at the room temperature by using a slid epoxy resin.

SEM observation of the molded bodies showed non-uniform distribution of the binder resin, allowing mixing of discrete magnet powder and binding resin. Many pores were also observed.

Sample No. 3a were defective as stated above, and could not effectively be subjected to measurement of characteristics such as mechanical strength.

EXAMPLE 4

The following two types of magnet powder, binder resin (thermoplastic resin) and additive were mixed together to form a mixture which was subjected to kneading, and the kneaded matter was granulated (grained) into granules. The granular material was charged in a mold of a molding machine and was pressure-molded (warm molding) under influence of a magnetic field. After the molding, cooling was executed while maintaining the same level of pressure as the molding pressure, whereby Sample Nos. 23a to 31a of rare earth bonded magnets were obtained. The amounts of the matters shown below are expressed in terms of the contents in the kneaded composition.

Composition
 Sm—Co type magnet powder:
 $Sm(Co_{0.0672}Fe_{0.22}Cu_{0.08}Zr_{0.028})_{8.35}$
 70.5 wt % (content in product magnet is almost the same as this value)
 Sm—Fe—N type magnet powder:
 $Nd_{12.0}Fe_{77.8}Co_{4.3}B_{5.9}$
 23.5 wt %
 Thermoplastic resin:
 Polyamide resin (nylon 12)
 5.0 wt %
 Antioxidant:Phenol-type antioxidant 1.0 wt %
 Mixing: Mixed by means of Henschel mixer
 Kneading: Kneaded by a twin-screw kneader at 150° C. to 300° C. Screw speed 100 to 300 r.p.m., kneading time (time of stay in the kneader) 5 to 15 minutes
 Granulation (Graining):
  Kneaded composition was granulated into granules of average sizes shown in Table 9, through grinding and classification.
 Molding:
  Granulated material was charged into a mold at room temperature by grading method, and pressure-molded under the influence of a transverse magnetic field (15 KOe) when temperature has been raised to 220° C. (first temperature). The molding pressure was 10 kgf/mm².
 Cooling:
  The molded body was cooled down to a predetermined pressure releasing temperature of 100° C. (second temperature) while the pressure was maintained. Samples were then taken out from the molds. The cooling was conducted by water cooling. The cooling rate in the cooling under pressure was 20 C./sec.
 Product shapes:
  Flat tabular shape (15 mm wide×2.5 mm thick and 5 m m high, aligned in the heightwise direction)

The weight, density, porosity, and height were examined with the samples of the rare earth bonded magnet thus obtained. The results are shown in Table 9.

From Table 9, it will be seen that superior quantitative control can be achieved by virtue of the suitable selection of granule size, thus enabling production of bonded magnet having low porosity and high dimensional precision. In particular, when the granule size falls within the range of from 0.01 mm to 2 mm as are the cases of Sample Nos. 23a to 30a, both low porosity (1.5 wt % or less, in particular 1% or less) and high dimensional precision (dimensional error being within ±5/100 mm) could be simultaneously obtained.

EXAMPLE 5

The following type of magnet powder, binder resin (thermoplastic resin) and additive were mixed together to form a mixture which was subjected to kneading, and the kneaded matter was -granulated (grained) into granules. The granular material was charged in a mold of a molding machine and was pressure-molded (warm molding) under influence of a magnetic field. After the molding, cooling was executed while maintaining the same level of pressure as the molding pressure, whereby Sample Nos. 32a to 42a of rare earth bonded magnets were obtained. The amounts of the matters shown below are expressed in terms of the contents in the kneaded composition.

Composition

Nd—Fe—B type magnet powder:

$Nd_{12.6}Fe_{69.3}Co_{12.0}B_{6.0}Zr_{0.1}$ 97.0 wt % (content in product magnet is almost the same as this value)

Thermoplastic resin:

Resin A or F shown in Table 1

1.5 wt % each

Antioxidant: Hydrazine-type antioxidant 1.4 wt %

Lubricant: Zinc stearate 0.1 wt %

Mixing: Mixed by means of Henschel mixer

Kneading: Kneaded by a twin-screw kneader at 150° C. to 350° C. Screw speed 100 to 300 r.p.m., kneading time (time of stay in the kneader) 5 to 10 minutes Granulation (Graining):

Kneaded composition was granulated into granules of average size of 0.3 mm through grinding and classification.

Molding:

Granulated material was charged into a mold at room temperature, and pressure-molded under the influence of a radial magnetic field (15 KOe) when temperature has been raised to molding temperature shown in Table 10 (first temperature). The molding pressure was 15 kgf/mm².

Cooling:

The molded body was cooled down to a predetermined pressure releasing temperature of 100° C. (second temperature) while the pressure was maintained. The pressure was released after demagnetization, followed by cooling down to normal temperature. Samples were then taken out from the molds. The cooling was conducted by water cooling. The cooling rate in the cooling under pressure was 30° C./sec.

Product shapes:

Cylindrical shape (20 mm outside diameter×18 mm inside diameter×5 mm height, compacted in the heightwise direction)

Flat tabular shape (20 mm square×3 mm thick (for use as mechanical strength test piece)

Magnetic performance (maximum magnetic energy product (BH)max), as well as density, porosity and mechanical strength were examined with the samples of the rare earth magnet powder thus obtained. The results are shown in Table 10. Methods of evaluations of the items are the same as those in Example 1.

As shown in Table 10, the binder resin was softened or molten when the molding temperature was set to be not lower than the thermal deformation temperature of the binder resin as are the cases of Sample Nos. 32a to 42a, so that the molding could be successfully carried out.

In particular, further reduction in porosity and, hence, further improvement in the magnetic performance cold be achieved when the molding was conducted at a temperature not lower than the melting temperature of the binder resin, as are the cases of Sample Nos. 33a to 36a and 40a to 42a.

EXAMPLE 6

The following type of magnet powder, binder resin (thermoplastic resin) and additive were mixed together to form a mixture which was subjected to kneading, and the kneaded matter was granulated (grained) into granules. The granular material was charged in a mold of a molding machine and was pressure-molded (warm molding) without application of magnetic field. After the molding, cooling was executed while maintaining the same level of pressure as the molding pressure, whereby Sample Nos. 43a to 52a of rare earth bonded magnets were obtained. The amounts of the matters shown below are expressed in terms of the contents in the kneaded composition.

Composition

Nano-crystalline Nd—Fe—B type magnet powder:

$Nd_{5.5}Fe_{66}B_{18.5}Co_5Cr_5$ 98.0 wt % (content in product magnet is almost the same as this value)

Thermoplastic resin:

Resin A or G shown in Table 1

1.0 wt % each

Antioxidant: Hydrazine-type antioxidant 1.0 wt %

Lubricant: Zinc stearate 0.1 wt %

Mixing: Mixed by means of Henschel mixer

Kneading:

Kneaded by a twin-screw kneader at 150° C. to 350° C. Screw speed 100 to 300 r.p.m., kneading time (time of stay in the kneader) 10 to 15 minutes Granulation (Graining):

Kneaded composition was granulated into granules of average size of 0.1 mm through grinding and classification.

Molding:

Granulated material was charged into a mold and pressure-molded when temperature has been raised to a predetermined molding temperature. More specifically, the molding temperature was 200° C. for the resin A and 300° C. for the resin G. The molding pressure was 25 kgf/mm².

Cooling:

The molded body was cooled down to a predetermined pressure releasing temperature shown in Table 11 (second temperature) while the pressure was maintained. Samples were then taken out from the molds. The cooling was conducted by water cooling. The cooling rate in the cooling under pressure was 50° C./sec.

Product shapes:

Cylindrical shape (10 mm outside diameter×7 mm inside diameter×7 mm height, compacted in the heightwise direction)

Magnetic performance (maximum magnetic energy product (BH)max), as well as density, porosity and the outside diameter were examined with the samples of the rare earth magnet powder thus obtained. The results are shown in Table 11. Methods of evaluations of the items are the same as those in Example 1.

As demonstrated by Sample Nos. 43a to 52a shown in Table 11, product magnets exhibit low porosity, high density and high dimensional precision (dimensional error within +5/100 mm), as well as superior magnetic performance, when the pressure releasing temperature is not higher than the melting temperature of the binder resin or when the difference between the pressure releasing temperature and the molding temperature is not smaller than 20° C. These advantages are more remarkable when lower pressure releasing temperature is employed.

In particular, when the pressure releasing temperature is not higher than the thermal deformation temperature of the binder resin as are the cases of Sample Nos. 46a, 47a, 50a, 51a and 52a, it is possible to obtain high density which approximates stoichiometric density, so that the product magnet exhibits extremely superior performance by making full use of the characteristics of the magnet powder.

EXAMPLE 7

The following types of magnet powder, binder resin (thermoplastic resin) and additive were mixed together to form a mixture which was subjected to kneading, and the kneaded matter was granulated (grained) into granules. The granular material was charged in a mold of a molding machine at the room temperature and was pressure-molded (warm molding) without application of magnetic field. After the molding, cooling was executed while maintaining the same level of pressure as the molding pressure, whereby Sample Nos. 1b to 6b of rare earth bonded magnets were obtained in which the magnet powder particles were bonded together by solidified binder resin.

Nd—Fe—B type magnet powder: $Nd_{12.0}Fe_{77.8}Co_{4.3}B_{5.9}$
97 wt % (content in product magnet is almost the same as this value)
Polyamide resin (PA12):
Melting temperature 178° C., thermal deformation temperature 145° C.
1.6 wt %
Antioxidant: Hydrazine-type antioxidant 1.0 wt %
Mixing: Mixed by means of Henschel mixer
Kneading: Kneaded by a twin-screw kneader at 150° C. to 250° C. Screw speed 100 to 250 r.p.m.,
Granulation (Graining):
Kneaded composition was granulated into granules of average size of 1 mm through grinding.
Molding:
The composition (granulated material) was charged into a mold and pressure-molded by means of a punch when temperature has been raised to a temperature shown in Table 12 (first temperature). The molding pressure was 10 kgf/mm².
Cooling:
The molded body was cooled while the pressure was maintained. The pressure was released when the temperature has come down to 100° C. (second temperature). Samples were then taken out from the molds. The cooling was conducted by air cooling. The cooling rate in the cooling under pressure was 0.5° C./sec.
Product shapes:
Solid cylindrical shape (10 mm diameter×7 mm height)
Flat tabular shape (20 mm square×3.0 mm thick)
Magnetic performance (magnetic flux density Br, coercive force iHc, maximum magnetic energy product (BH) max), as well as density, porosity and mechanical strength were examined with the samples of the rare earth magnet powder thus obtained. The results are shown in Table 12. Methods of evaluations of the items appearing in Table 12 are the same as those in Example 1.

As will be seen from Table 12, the density and porosity of the product bonded magnet tend to increase and decrease, respectively, when the molding temperature is elevated. Specifically low porosity is obtained so as to provide high levels of mechanical strength and magnetic performance, when the molding temperature is not lower than the melting temperature of the thermoplastic resin, as in the cases of Sample Nos. 3b to 6b.

EXAMPLE 8

Each of the magnet powders shown in Table 13, a binder resin (thermoplastic resin) and additive were mixed together to form a mixture which was subjected to kneading, and the kneaded matter was granulated (grained) into granules. The granular material was charged in a mold of a molding machine and was pressure-molded (warm molding) without application of magnetic field. After the molding, cooling was executed while maintaining the same level of pressure as the molding pressure, whereby Sample Nos. 7b to 31b of rare earth bonded magnets were obtained in which the magnet powder particles were bonded together by solidified binder resin.

Composition
Magnetic powder:
Each of the powders 1 to 5 shown in Table 13
96.0 wt % (content in product magnet is almost the same as this value)
Polyamide resin (PA 12):
Melting temperature 178° C., thermal deformation temperature 145° C.
2.55 wt %
Antioxidant: Hydrazine-type antioxidant, 1.4 wt %
Other additive: Higher fatty acid (Stearic acid), 0.05 wt %
Mixing: Mixed by means of Henschel mixer
Kneading: Kneaded by a twin-screw kneader at 150° C. to 250° C. Screw speed 100 to 250 r.p.m.,
Granulation (Graining):
Kneaded composition was granulated into granules of average size of 0.5 mm through grinding and classification.
Molding:
The composition (granulated material) was charged into a mold and pressure-molded by means of a punch when temperature has been raised to 230° C. (first temperature). The molding pressure was 15 kgf/mm².
Cooling:
The molded body was cooled while the pressure was maintained. The pressure was released when the molded body has been cooled to temperatures shown in Table 14 (second temperature). Samples were then taken out from the molds. The cooling was conducted by air cooling. The cooling rate in the cooling under pressure was 2° C./sec.
Product shapes:
Cylindrical shape (20 mm outside diameter×18 mm inside diameter×10 mm height)
The values of the average granule sizes appearing in Table 13 were obtained through measurement in accordance with F.S.S.S. (Fisher Sub-Sieve Sizer). The density, porosity and circularity (dimensional precision) were examined with the samples of the rare earth magnet powder thus obtained. The results are shown in Tables 14 and 15. Methods of evaluations of the items appearing in Tables 14 and 15 were as follows.

Density: The same as that in Example 1
Porosity: The same as that in Example 1
Circularity:
Outside diameter of the molded body was measured at 10 points and the circularity was determined through the following calculation based on the maximum and minimum measured outside diameters.

Circularity=(maximum value−minimum value)/2

As will be seen Tables 14 and 15, such a tendency was observed with each of the magnet powder compositions that a lower pressure releasing temperature in the course of cooling provides a greater density and smaller porosity of the bonded magnet and reduces the risk of deformation of the sample when the same is separated from the mold, thus offering improved circularity (dimensional precision). Extremely high degree of circularity (dimensional precision) is obtained when the pressure releasing temperature is not higher than the melting temperature (178° C.), in particular not higher than the thermal deformation temperature (145° C.) of the thermoplastic resin used as the binder resin.

EXAMPLE 9

The following type of magnet powder, each of the binder resins (thermoplastic resins) shown in Table 16 and additive were mixed together to form a mixture which was subjected to kneading, and the kneaded matter was granulated (grained) into granules. The granular material was charged in a mold of a molding machine and was pressure-molded (warm molding) under the influence of a magnetic field. After the moBding, coong w exeted ile intaing e sa lev of essu as e moing essu, wheby mpleos.3 to b ofare rth ndedagne werobtaed iwhicthe gnetowdepartles re bded geth by lidied bder sin.

Magnet powder: $Sm(Co_{0.672}Fe_{0.22}Cu_{0.08}Zr_{0.028})_{8.35}$ 96.5 wt % (content in product magnet is almost the same as this value)

Thermoplastic resin:

One of resins A to G shown in Table 16, A+B, each 2.3 wt %

Antioxidant: Phenol-type antioxidant 1.2 wt %

Mixing: Mixed by means of Henschel mixer

Kneading:

Kneaded by a twin-screw kneader. As to the kneading temperature, reference be made to Table 5. Screw speed 100 to 250 r.p.m., Granulation (Graining):

Kneaded composition was granulated into granules of average size of 0.5 mm through grinding and classification.

Molding:

The composition (granulated material) was charged into a mold at the room temperature and pressure-molded by means of a punch when the mold temperature has been raised to a temperature shown in Table 16 (first temperature). The molding pressure was 10 kgf/mm². A radial magnetic field (aligning magnetic field of 15 KOe) was applied immediately before the pressurizing.

Cooling:

The molded body was cooled while the pressure was maintained.

Demagnetization was conducted at a temperature shown in Tables 17 to 19 (second temperature). Samples were then taken out from the molds. The cooling was conducted by water cooling. The cooling rate in the cooling under pressure was 10° C./sec.

Product shapes:

Cylindrical shape (30 mm outside diameter×27 mm inside diameter×5 mm height)

The values of thermal deformation temperature appearing in Table 16 were obtained through measurement in accordance with the aforementioned ASTM D648.

The density, porosity and the circularity (dimensional precision) of the samples of rare earth bonded magnet thus obtained were measured to obtain the results as shown in Tables 17, 18 and 19.

Evaluations of the measurement items appearing in Tables 17, 18 and 19 were the same as those in Examples 1 and 8.

As will be seen Tables 17 to 19, such a tendency was observed with each of the binder resin compositions that a lower pressure releasing temperature in the course of cooling provides a greater density and smaller porosity of the bonded magnet, thus offering improved circularity (dimensional precision). Extremely high degree of circularity (dimensional precision) is obtained when the pressure releasing temperature is not higher than the melting temperature, in particular not higher than the thermal deformation temperature of the thermoplastic resin used as the binder resin.

Magnetic performance was examined with each of the samples shown in Tables 17 to 19. All these samples showed superior magnetic characteristics: namely, magnetic flux densities Br not lower than 7.0 KG, coercive force iHc not smaller than 7 KOe and maximum magnetic energy product (BH)max not smaller than 13 MGOe.

EXAMPLE 10

Magnet powders, binder resins (thermoplastic resins) and an additive were mixed to form compositions as shown in Table 20. The mixture was kneaded and the kneaded composition was granulated (grained) to form granules which were then charged in a mold of a molding machine and pressure-molded (warm molding) without application of magnetic field. Then, cooling was conducted in which the pressure of the same level as the molding pressure was maintained until the temperature comes down to the melting point and thereafter the cooling was continued with progressive reduction of the pressure to about 50% the compacting pressure, whereby Sample Nos. 63b to 80b of the rare earth bonded magnet were obtained in which magnet powder particles were bonded together by the solidified binder resin. The contents of the magnetic powder in the sample magnets thus obtained were almost the same as those in Table 20.

Magnet powder: $Nd_{12.0}Fe_{77.8}Co_{4.3}B_{5.9}$

Polyamide resin (PA12):

Melting temperature 178° C.

Thermal deformation temperature 145° C.

Antioxidant: Hydrazine-type antioxidant

Mixing: Mixed by means of a Henschel mixer

Kneading: Kneaded by a twin-screw kneader,

Kneading temperature 100 to 250° C.

Screw speed 100 to 250 r.p.m.

Granulation (Graining):

Kneaded composition was granulated into granules of an average size of 0.5 mm through grinding and kneading.

Molding:

The composition (granules) was charged into a mold at room temperature and pressure-molded by means of a punch when the mold has been heated to 220° C. (first temperature). The molding pressure was 20 kgf/mm².

Cooling:

Cooling was conducted while keeping the molded body under pressure (pressure progressively decreased in relation to time), and the pressure was completely nullified when the temperature has come down to the temperatures shown in Tables 21 and 22 (second temperature). The samples were then taken out of the mold. The cooling was conducted by water cooling. The rate of cooling under pressure was 50° C./sec.

Product shape:

Roof-tile shape (8 mm outside curvature radius (R)×7 mm inside curvature radius (r)×120 sector angle×8 mm height)

The density, porosity, circularity (dimensional precision) and the magnetic characteristic (maximum magnetic energy product (BH)max) were measured on each of these samples to obtain the results as shown in Tables 21 and 22.

Methods of evaluation of the items appearing in tables 21 and 22 were the same as those in Examples 1 and 8.

As will be seen Tables 21 and 22, such a tendency was observed with each of the magnet powder contents that a lower pressure releasing temperature in the course of cooling provides a greater density and smaller porosity of the bonded magnet, thus offering improved circularity (dimensional precision). Extremely high degree of circularity (dimensional precision) is obtained when the pressure releasing temperature is not higher than the melting temperature, in particular not higher than the thermal deformation temperature of the thermoplastic resin used as the binder resin.

EXAMPLE 11

Magnet powders, binder resins (thermoplastic resins) and additives such as antioxidants were mixed to form compositions shown in Table 23. Each mixture was kneaded and the kneaded composition was granulated (grained) to form granules which were then charged in a mold of a molding machine at room temperature and pressure-molded (warm molding) with or without application of magnetic field. Then, cooling was conducted to obtain Sample Nos. 1c to 6c of the rare earth bonded magnet.

The conditions under which these samples were prepared were as follows.

Mixing: Mixed by means of a Henschel mixer

Kneading:

Kneaded by a twin-screw kneader. Kneading temperature was 200 to 350° C.

Screw speed was 100 to 300 r.p.m. The kneaded composition was extruded in the form of a circular rod of 10 mm diameter which was then cut into pellets of 5 to 15 mm long.

Granulation:

The pellets were ground into powder particles of 1 mm mesh or smaller size. Mean particle size was from 0.2 to 0.8 mm in each sample.

Molding:

Molded by means of a hydraulic press. As to the molding temperature, a reference be made to Table 24. The molding pressure was 10 kgf/mm². The product shape was cylindrical (20 mm outside diameter×17 mm inside diameter×5 m m height)

Cooling:

Cooled down to normal temperature under the atmospheric pressure.

The magnetic flux density Br, coercive force iHc, maximum magnetic energy product (BH)max, density and porosity were measured on these samples of the rare earth bonded magnet thus obtained. The results are shown in Table 24. The measurements were carried out in accordance with the following methods.

Magnetic performance:

Specimen of 5 mm square was cut out of each sample and pulse magnetized at 40 KOe. The magnetized test piece was then subjected to measurement conducted by using a vibration specimen magnetometer (VSM).

Measurement of density:

The same as that in Example 1

Measurement of porosity:

The same as that in Example 1

COMPARATIVE EXAMPLE 3

Magnet powders, binder resins (thermoplastic resins) and additives such as antioxidants were mixed to form compositions shown in Table 23. Each mixture was kneaded and the kneaded composition was pelletized into pellets which were then charged in a mold of a molding machine at room temperature and pressure-molded (low-temperature warm molding) with or without application of magnetic field. Then, cooling was conducted to obtain Sample Nos. 7c to 12c of the rare earth bonded magnet.

The conditions under which these samples were prepared were as follows.

Mixing: The same as that in Example 11

Kneading: The same as that in Example 11

Granulation: Not conducted

Molding:

The same as that in Example 11 except that different molding temperatures and pressures were employed as shown in Table 25.

Cooling:

Cooled under pressure was conducted down to the pressure releasing temperatures shown in Table 25. The pressure was released after demagnetization of the molded body in the mold.

The results of the molding operations were as follows.

Preparation of Sample Nos. 7c to 12c faced a difficulty in charging the pellets into the mold, since the minimum mold gap size (magnet wall thickness) was as small as 1.5 mm while the pellet size was 10 mm×5 mm at the smallest. Therefore, the molding required grinding the pellets by a punch, or heating and melting the pellets, followed by a plurality of stroke cycles of the punch for forcibly charging the material. Thus, a laborious work was required in the molding, resulting in a prolonged cycle time, making it difficult to mold the magnet at low costs. In addition, it was difficult to control the amount of the material charged into the mold, so that the dimensions of the products tend to largely fluctuate with respect to the target dimensions (sample length), thus impairing dimensional stability.

In addition, each of Sample Nos. 7c to 12c showed high level of porosity despite elevated molding pressure, due to the fact that the molding temperature was below the thermal deformation temperature of the binder resin.

EXAMPLE 12

The following types of magnet powder, binder resin (thermoplastic resin) and additive were mixed together to form a mixture which was subjected to kneading, and the kneaded matter was granulated (grained) into granules. The granular material was charged in a mold of a molding machine at the room temperature and was pressure-molded (cold molding) under the influence of a magnetic field. Then, a heat treatment was conducted followed by cooling, whereby Sample No. 13c of rare earth bonded magnets was obtained.

Magnet powder:

$Nd_{9.6}Pr_{2.4}Fe_{77.8}Co_{4.3}B_{5.9}$

Average particle size 20 µm (measured by F.S.S.S.)

96.5 wt % (content in product magnet is almost the same as this value)

Binder resin:

PPS (Polyphenylene sulfide) resin 2.3 wt %

Antioxidant: Hydrazine-type antioxidant 1.2 wt %

Mixing: The same as that in Example 11

Kneading: The same as that in Example 11

Granulation:

Pellets were ground into powder particles of 0.8 mm mesh or smaller size.

Average granule size was 0.5 mm.

Molding:

Molding was conducted by using a hydraulic press at the room temperature and molding pressure of 70 kgf/mm² without application of magnetic field. Tentative molded body was obtained.

The shape of the molded body was cylindrical (target dimensions: 25.00 mm outside diameter×23.00 mm inside diameter×1000 mm height).

Mold size: Annular gap of 24.35 mm outside diameter× 22.40 mm inside diameter

Heat treatment:

Heated at 320° C. for 10 minutes to melt the resin component thereby bonding resin particles together to improve mechanical strength.

The dimensional precision, magnetic performance, density and porosity were examined on this Sample of the rare earth bonded magnet thus obtained. The results are shown below.

Dimensions of molded body:

24.98 mm outside diameter 23.01 mm inside diameter× 10.02 mm height (average value over n=10)

Fluctuation of height (length)=0.02

Magnetic performance:

Br=6.8 KG, iHc=9.63 KOe, (BH)max=9.6 MGOe

Density: 6.8 g/cm³

Porosity: 2.06%

(The magnetic performance was measured by means of a D.C. magnetometer under application of maximum magnetic field of 25 KOe, after pulse-magnetization at 40 KOe.)

In Example 12, it was confirmed that the charging (feeding) of the material into the mold could be delicately controlled, so that an extremely high dimensional precision could be obtained. At the same time, superior magnetic performance could be obtained, as well as extremely small porosity.

COMPARATIVE EXAMPLE 4

The following types of magnet powder, binder resin (thermoplastic resin) and additive were mixed together to form a mixture which was subjected to kneading, and pellets of the kneaded composition was charged in a mold of a molding machine at the room temperature and was pressure-molded (cold molding) under the influence of a magnetic field. Then, a heat treatment was conducted followed by cooling, whereby Sample No. 14c of rare earth bonded magnet was obtained.

Magnet powder:

$Nd_{9.6}Pr_{2.4}Fe_{77.8}Co_{4.3}B_{5.9}$

Average particle size 20 pm (measured by F.S.S.S.)

96.5 wt % (content in product magnet is almost the same as this value)

Binder resin:

PPS (Polyphenylene sulfide) resin 2.3 wt %

Antioxidant: Hydrazine-type antioxidant 1.2 wt %

Mixing: The same as that in Example 11

Kneading: The same as that in Example 11

Granulation: Not conducted.

Molding: The same as that in Example 12

Heat treatment: The same as that in Example 12

The dimensional precision was examined on this Sample of the rare earth bonded magnet thus obtained. The results are shown below.

Dimensions of molded body:

24.98 mm outside diameter×2 3.01 mm inside diameter× 9.52 mm height (average value over n=10)

Fluctuation of height (length)=0.90

Comparative Example 4 showed that, due to lack of the granulating step, feed of the material into the mold was rendered unstable as in the case of Comparative Example 3. Thus, it was found difficult to stably carry out the molding due to fluctuation particularly in the heightwise dimension. Furthermore, the punch had to be moved up and down repeatedly in order to feed the material so as to crush and force the material into the mold, resulting in a prolonged molding time. In addition, the punch was broken during feeding of the material.

EXAMPLE 13

The following types of magnet powder, binder resin (thermosetting resin) and additive were mixed together to form a mixture which was subjected to kneading, and the kneaded matter was granulated (grained) into granules. The granular material was charged in a mold of a molding machine at the room temperature and was pressure-molded (warm molding) under the influence of a magnetic field. Then, a heat treatment was conducted to harden the resin, followed by cooling, whereby Sample No. 15c of rare earth bonded magnets was obtained.

Magnet powder:

$Sm(Co_{0.672}Fe_{0.22}Cu_{0.08}Zr_{0.028})_{8.35}$

Average particle size 20 µm (measured by F.S.S.S.)

97.5 wt % (content in product magnet is almost the same as this value)

Binder resin:

Phenol resin 2.45 wt %+organic solvent

Solid phase at room temperature, Softening temperature 60° C.

Antioxidant: Zinc stearate 0.05 wt %

Mixing:

Mixing was conducted by using a general purpose blender while allowing the organic solvent to evaporate.

Granulation:

Granulated into powder of 180 µm mesh or smaller size, by grinding. Average granule size was 100 µm.

Molding:

Molding was conducted by using a hydraulic press at 80° C. and molding pressure of 30 kgf/mm² under the influence of an aligning magnetic field of 17 KOe (transverse magnetic field). Tentative molded body was obtained.

The shape of the molded body was roof-tile shape (target dimensions: 15.00 mm outside curvature radius (R)× 12.00 mm inside curvature radius (r)×120° sector angle×8.00 mm height).

Magnetic field aligned in the radial direction. Demagnetized in the mold after the pressurizing.

Mold size: Gap of R 14.70 mm×r 11.80 mm×120° sector angle

Heat treatment:

Heated at 180° C. for 2 hours.

The dimensional precision, magnetic performance, density and porosity were examined on this Sample of the rare earth bonded magnet thus obtained. The results are shown below.

Dimensions of molded body:

R 15.03 mm×r 12.01 mm×120° sector angle×17.98 mm (average value over n=10)

Fluctuation of height (length)=0.015

Magnetic performance:

Br=7.8 KG, iHc=7.10 KOe, (BH)max=13.6 MGOe

Density: 7.11 g/cm$^3$

Porosity: 4.63%

(The magnetic performance was measured by VSM on a specimen of 5 mm square specimen cut out of the roof-tile shaped molded body.)

In Example 13, it was confirmed that the charging (feeding) of the material into the mold could be delicately controlled, so that an extremely high dimensional precision could be obtained. At the same time, superior magnetic performance could be obtained, as well as extremely small porosity.

COMPARATIVE EXAMPLE 5

The following types of magnet powder, binder resin (thermosetting resin) and additive were mixed together to form a mixture which was charged in a mold of a molding machine at the room temperature and was pressure-molded (cold to low-temperature warm molding) under the influence of a magnetic field so that the resin was hardened. Then, a heat treatment was conducted followed by cooling, whereby Sample Nos. 16c, 17c and 18c of rare earth bonded magnets were obtained.

Magnet powder:

$Sm(Co_{0.672}Fe_{0.22}Cu_{0.08}Zr_{0.028})_{8.35}$

Average particle size 20 μm (measured by F.S.S.S.)

97.5 wt %

Binder resin:

Phenol resin 2.45 wt %+organic solvent

Solid phase at room temperature, Softening temperature 60° C.

Antioxidant: Zinc stearate 0.05 wt %

Mixing:

Mixing was conducted by using a general purpose blender while allowing the organic solvent to evaporate.

Molding:

Molding was conducted by using a hydraulic press at 25° C. (Sample No. 16c), 40° C. (Sample No. 17c) and 50° C. (Sample No. 18c), and at molding pressure of 30 kgf/mm$^2$ under the influence of an aligning magnetic field of 17 KOe (transverse magnetic field). Tentative molded body was obtained. The molded body was demagnetized while it is in the mold and then taken out of the mold.

The shape of the molded body was roof-tile shape (target dimensions: 15.00 mm outside curvature radius (R)×1 2.00 mm inside curvature radius (r)×120° sector angle×8.00 mm height).

Magnetic field aligned in the radial direction.

Mold size: Gap of R 14.70 mm×r 11.80 mm×120° sector angle

Heat treatment:

Heated at 180° C. for 2 hours.

The dimensional precision of Samples of the rare earth bonded magnet thus obtained were examined. The results are shown below.

Dimensions of molded body:

R 15.01 mm×r 11.98 mm×120° sector angle×17.46 mm (average value over n=10)

Fluctuation of height (length)=0.58

In Comparative Example 5 (Sample Nos. 16c to 18c), the feed of the material into the mold was rendered unstable due to lack of the granulating step. Thus, it was difficult to stably conduct the molding due to fluctuation particularly in the heightwise dimension. In addition, the punch had to be moved up and down repeatedly to feed the material, thus prolonging the molding time. Furthermore, an additional step had to be employed for cleaning the punch, in order to remove the material depositing and remaining on side faces of the punch without being fed into the mold.

EXAMPLE 14

The following types of magnet powder and binder resin (thermosetting resin) were mixed together to form a mixture which was subjected to kneading, and the kneaded matter was granulated (grained) into granules. The granular material was charged in a mold of a molding machine at the room temperature and was pressure-molded (cold molding) without application of magnetic field. Then, a heat treatment was conducted to harden the resin, followed by cooling, whereby Sample No. 19c of rare earth bonded magnets was obtained.

Magnet powder:

$Nd_{12.0}Fe_{77.8}Co_{4.3}B_{5.9}$

Average particle size 25 μm (measured by F.S.S.S.)

98.0 wt % (content in product magnet is almost the same as this value)

Binder resin:

Bisphenol A novolak resin+amine-type curing agent 2.0 wt % in total

Liquid phase at room temperature

Mixing:

Mixing was conducted by using a general purpose blender.

Kneading:

Kneading was conducted by using a Raikai kneader.

Granulation:

Kneaded composition was formed into granules of 0.6 mm mesh or smaller size by an extrusion granulator.

Average granule size was 0.4 mm.

Molding:

Molding was conducted by using a hydraulic press at the room temperature and molding pressure of 50 kgf/mm$^2$. Tentative molded body was obtained.

The shape of the molded body was cylindrical (target dimensions: 10.00 mm outside diameter×8.00 mm inside diameter×7.00 mm height).

Magnetic field aligned in the radial

Mold size: Gap of 9.65 mm outside diameter×7.75 mm inside diameter

Heat treatment:

Heated at 150° C. for 1 hour.

The dimensional precision, magnetic performance, density and porosity were examined on this Sample of the rare earth bonded magnet thus obtained. The results are shown below.

Dimensions of molded body:

9.99 mm outside diameter×7.98 mm inside diameter×7.02 mm height(average value over n=10)

Fluctuation of height (length)=0.030

Magnetic performance:

Br=7.51 KG, iHc=9.67 KOe, (BH)max=11.5 MGOe

Density: 6.44 9/cm$^3$

Porosity: 5.40%

(The magnetic performance was measured by a D.C. magnetometer under application of maximum magnetic field of 25 KOe, after pulse-magnetization at 40 KOe.)

In Example 14, it was confirmed that the charging (feeding) of the material into the mold could be delicately controlled, so that an extremely high dimensional precision could be obtained. At the same time, superior magnetic performance could be obtained, as well as small porosity.

COMPARATIVE EXAMPLE 6

The same magnet powder and binder resin (thermosetting resin) as those used in Example 14 were mixed together to form a mixture which was charged in a mold of a molding machine and was pressure-molded (cold molding) without application of magnetic field. Then, a heat treatment was conducted to harden the resin, followed by cooling, whereby Sample No. 20c of rare earth bonded magnets was obtained.

Thus, the process was the same as Example 14 except that granulation was omitted.

The dimensional precision of Sample of the rare earth bonded magnet thus obtained was examined. The results are shown below.

Dimensions of molded body:

9.99 mm outside diameter×7.98 mm inside diameter×6.72 mm height (average value over n=10)

Fluctuation of height=0.86

In Comparative Example 6, the feed of the material into the mold was rendered unstable due to lack of the granulating step. Thus, it was difficult to stably conduct the molding due to fluctuation particularly in the heightwise dimension. In addition, the punch had to be moved up and down repeatedly to feed the material, thus prolonging the molding time. Furthermore, an additional step had to be employed for cleaning the punch, in order to remove the material depositing and remaining on side faces of the punch without being fed into the mold.

EXAMPLE 15

The following types of magnet powder, binder resin (thermoplastic resin) and additive were mixed together to form a mixture which was subjected to kneading, and the kneaded matter was granulated (grained) into granules. The granular material was charged in a mold of a molding machine at the room temperature and was pressure-molded (warm molding) without application of magnetic field followed by cooling, whereby Sample Nos. 21c to 27c of rare earth bonded magnet were obtained.

Magnet powder:

$Nd_{12.0}Fe_{77.8}Co_{4.3}B_{5.9}$

Average particle size 25 μm (measured by F.S.S.S.)

97.2 wt % (content in product magnet is almost the same as this value)

Binder resin:

Polyamide (PA12) resin 1.4 wt %

Antioxidant: Hydrazine-type antioxidant 1.4 wt %

Mixing: The same as that in Example 11

Kneading:

Kneading was conducted by using a twin-screw kneader, at kneading temperatures of 150 to 250° C. and screw speed of 100 to 250 r.p.m.

The kneaded composition was extruded in the form of a circular rod of 10 mm diameter and was pelletized into pellets of 5 to 15 mm long.

Granulation:

Grain size was regulated through grinding and classification. As to maximum grain size and minimum grain size, reference be made to Table 26.

Molding:

Molding was conducted by using a hydraulic press at a molding temperature of 230° C. and molding pressure of 10 kgf/mm$^2$.

The shape of the molded body was cylindrical (target dimensions: 18.00 mm outside diameter×14.00 mm inside diameter×1000 mm height).

Charging of material into the mold was conducted weighing 6.44 g of the granular material and feeding the whole weighed material into the mold gap in the circumferential direction.

The density, porosity and the height were examined on these Sample of the rare earth bonded magnet thus obtained. The results are as shown in Table 26.

As will be seen from Table 26, the porosity tends to increase as the granule size of the granulated material becomes smaller. This is attributed to the fact that smaller granule size enhances trapping of air during the molding.

Therefore, the lower limit of the granule size is preferably set to 0.1 mm, more preferably to 0.02 mm and most preferably to 0.05 mm.

Feeding of the material into the mold can be conducted without difficulty if the maximum granule size of the granulated material is not greater than the minimum mold gap size (2.0 mm). Each sample showed a dimensional error of ±5/100 mm, thus demonstrating high dimensional precision.

EXAMPLE 16

The following types of magnet powder, binder resin (thermoplastic resin) and additive were mixed together to form a mixture which was subjected to kneading, and the kneaded matter was granulated (grained) into granules. The granular material was charged in a mold of a molding machine at the room temperature and was pressure-molded (warm molding) without application of magnetic field followed by cooling, whereby Sample Nos. 28c to 31c of rare earth bonded magnet were obtained.

Magnet powder:

$Nd_{12.0}Fe_{77.8}Co_{4.3}B_{5.9}$

Average particle size 25 μm (measured by F.S.S.S.)

97.0 wt % (content in product magnet is almost the same as this value)

Binder resin:
Polyamide (PA12) resin+polyamide (PA6-12) resin, PA12/PA6-12 ratio being 5/5, total content 1.6 wt %
Antioxidant: Hydrazine-type antioxidant 1.4 wt %
Mixing: The same as that in Example 11
Kneading: The same as that in Example 15
Granulation:
Granulation was done by grinding and classification such that the maximum granule size of 5 mm (average size 2 mm).
Molding:
Molding was conducted by using a hydraulic press at a molding temperature of 230° C. and molding pressure of 10 kgf/mm².

The shape of the molded body was flat tabular shape. (target dimensions: 10.00 mm wide×(a) mm thick ((a) being variable)×10.00 mm height).

A plurality of molds having different sizes "a" (shown in Table 27) with fixed width 10 mm were used. The amount of granular material charged into the molds was adjusted (as shown in Table 27), such that the molded body has the height of 10 mm regardless of variation of the thickness size "a".

Weights and heights of the samples of rare earth bonded magnet thus obtained were measured to obtain the results shown in Table 27.

As will be seen from table 27, the dimensional error is smaller when the maximum granule size of the granulated material becomes smaller relative to the minimum mold gap size "a". In particular, specifically high dimensional precision is obtained when the mold gap size "a" is not smaller than the maximum granule size (5 mm), as in the cases of Sample Nos. 31c to 33c.

EXAMPLE 17

Sample Nos. 34c to 40c of the rare earth bonded magnet were prepared by the same process as Example 15, except that a 5-minute heat treatment at 230° C. was conducted subsequent to the pressure molding. Results of measurement were substantially the same as those shown in Table 26.

EXAMPLE 18

Sample Nos. 41c to 46c of the rare earth bonded magnet were prepared by the same process as Example 15, except that a 3-minute heat treatment at 200° C. was conducted subsequent to the pressure molding. Results of measurement were substantially the same as those shown in Table 27.

As will be understood from the foregoing description, according to the present invention, it is possible to obtain, even with reduced amount of binder resin, a rare earth bonded magnet which excels in moldability, porosity, mechanical strength, corrosion resistance (durability), dimensional stability (dimensional precision) and magnetic performance.

An extremely low porosity and further improved dimensional stability are obtainable when the size of the granular material falls within a desired range.

The molding may be carried out by warm molding, so that rare earth bonded magnets having advantageous features set forth above can be manufactured with comparatively low molding pressure, thus offering ease of manufacture. This offers a reduction in the production costs and enhances adaptation to mass-production.

Specifically low porosity and extremely high dimensional stability of the rare earth bonded magnet are achieved when the second temperature (pressure releasing temperature) in the cooling step is not higher than the melting temperature, in particular not higher than the thermal deformation temperature, of the thermoplastic resin used, or when the difference between the first and second temperatures is greater than a predetermined value.

The improvement in the corrosion resistance and dimensional stability, not to mention the magnetic characteristics, greatly contributes to improvement in the performance of a device such as a micro-motor incorporating the magnet of the invention.

TABLE 1

| Resin No. | Binder resin (Thermoplastic resin) | Melting point [°C.] | Thermal deformation temp. [°C.] |
|---|---|---|---|
| A | Polyamide resin (PA12) | 178 | 145 |
| B | Polyamide resin (Copolymer PA6-12) | 145 | 46 |
| C | Polyamide resin (PA6) | 215 | 180 |
| D | Polypropylene resin (PP) | 174 | 105 |
| E | Polypropylene resin (PE) | 128 | 86 |
| F | Copolymeric polyester (Liquid crystal polymer: LCP) | 280 | 180 |
| G | Polyphenylene sulfide (PPS) | 287 | 260 |

TABLE 2

(Example 1)

| Sample No. | Binder resin | Kneading temp. [°C.] | Molding temp. [°C.] | Press. release temp. [°C.] | Molding press. [kgf/mm²] |
|---|---|---|---|---|---|
| 1a | A | 150~250 | 220 | 100 | 10 |
| 2a | B | 100~250 | 200 | 40 | 15 |
| 3a | A (50%) +B (25%) | 150~250 | 230 | 120 | 10 |
| 4a | A (50%) +B (50%) | 140~250 | 210 | 40 | 7.5 |
| 5a | C | 190~290 | 250 | 150 | 20 |
| 6a | D | 120~250 | 210 | 90 | 25 |
| 7a | E | 100~200 | 150 | 70 | 10 |
| 8a | F | 200~350 | 320 | 140 | 30 |
| 9a | G | 260~360 | 300 | 240 | 25 |

TABLE 3

(Example 1)

| Sample No. | Br [kG] | iHc [kOe] | (BH) max [MGOe] | Density [g/cm³] | Porosity [%] | Mechanical strength [kgf/mm²] | Corrosion resistance [hrs] |
|---|---|---|---|---|---|---|---|
| 1a | 7.21 | 9.26 | 10.1 | 6.01 | 0.59 | 7.90 | >500 |
| 2a | 7.19 | 9.31 | 10.0 | 6.03 | 0.73 | 7.45 | >500 |
| 3a | 7.23 | 9.23 | 10.1 | 6.03 | 0.37 | 7.78 | >500 |
| 4a | 7.22 | 9.21 | 10.0 | 6.03 | 0.49 | 7.60 | >500 |
| 5a | 7.27 | 9.27 | 10.0 | 6.08 | 0.92 | 8.10 | 300 |
| 6a | 7.24 | 9.35 | 10.3 | 5.88 | 0.58 | 6.95 | 300 |
| 7a | 7.23 | 9.30 | 10.2 | 5.95 | 0.38 | 5.80 | 350 |
| 8a | 7.03 | 9.12 | 9.8 | 6.29 | 0.64 | 9.65 | 450 |
| 9a | 7.01 | 9.10 | 9.8 | 6.27 | 0.59 | 9.73 | 450 |

TABLE 4

| Resin No. | Binder resin (Themosetting resin) | Softening temp. [°C.] | Hardening conditions |
|---|---|---|---|
| H | Bisphenol A epoxy resin | R'm temp. or less (Approx. 10 C) | 150° C. 1 hr |
| I | Phenol novolak resin | 80 | 170° C. 2 hr |
| J | Phenol resin | 70 | 180° C. 4 hr |

TABLE 5

(Example 2)

| Sample No. | Binder resin | Kneading temp. [°C.] | Molding temp. [°C.] | Press. release temp. [°C.] | Molding press. [kgf/mm$^2$] |
|---|---|---|---|---|---|
| 10a | H | R'm temp. | R'm temp. | 5 | 60 |
| 11a | H | R'm temp. | R'm temp. | 5 | 65 |
| 12a | I | 80~100 | 120 | 50 | 70 |
| 13a | I | 80~100 | 120 | 50 | 100 |
| 14a | J | 70~90 | 100 | 50 | 100 |
| 15a | J | 70~90 | 100 | 50 | 120 |

TABLE 6

(Example 2)

| Sample No. | (BH) max [MGOe] | Density [g/cm$^2$] | Porosity [%] | Mechanical strength [kgf/mm$^2$] | Corrosion rsistance [hrs] |
|---|---|---|---|---|---|
| 10a | 8.8 | 5.81 | 5.92 | 3.75 | 2000 |
| 11a | 9.1 | 5.85 | 5.27 | 3.86 | 2000 |
| 12a | 9.0 | 5.82 | 5.75 | 3.91 | 2000 |
| 13a | 9.3 | 5.86 | 5.11 | 3.98 | 2000 |
| 14a | 9.2 | 5.90 | 6.83 | 4.01 | 2000 |
| 15a | 9.4 | 6.02 | 4.93 | 4.11 | 2000 |

TABLE 7

(Example 3)

| Sample No | Kneader type | Kneading temp. [°C.] | Kneader speed [rpm] | Rate |
|---|---|---|---|---|
| 16a | Twin-extrusion kneader | 170~320 | 100~250 | 30 kg/hr |
| 17a | Roll kneader | 180~300 | 10~100 | 5 kg/batch, 15 min/batch |
| 18a | Ordinary kneader | 180~300 | 20~100 | 10 kg/batch, 30 min/batch |
| 19a | KCK | 170~320 | 20~80 | 20 kg/hr |

TABLE 8

(Example 3)

| Sample No. | (BH) max [MGOe] | Density [g/cm$^3$] | Porosity [%] | Mechanical strength [kgf/mm$^2$] | Corrosion resistance [hrs] |
|---|---|---|---|---|---|
| 16a | 15.2 | 6.63 | 0.65 | 8.14 | >1000 |
| 17a | 15.5 | 6.65 | 0.35 | 8.23 | >1000 |
| 18a | 14.9 | 6.61 | 0.95 | 8.09 | >1000 |
| 19a | 15.3 | 6.63 | 0.65 | 8.19 | >1000 |

TABLE 9

(Example 4)

| Sample No. | Mean grain size [mm] | Molded product weight [mg] | Density [g/cm$^3$] | Porosity [%] | Height [mm] |
|---|---|---|---|---|---|
| 23a | 2 | 1073 | 5.78 | 0.30 | 4.95 |
| 24a | 1.8 | 1075 | 5.78 | 0.30 | 4.96 |
| 25a | 1.5 | 1077 | 5.78 | 0.30 | 4.97 |
| 26a | 1 | 1079 | 5.78 | 0.30 | 4.98 |
| 27a | 0.5 | 1083 | 5.79 | 0.12 | 4.99 |
| 28a | 0.1 | 1081 | 5.79 | 0.12 | 4.98 |
| 29a | 0.05 | 1080 | 5.76 | 0.64 | 5.00 |
| 30a | 0.01 | 1075 | 5.72 | 1.33 | 5.01 |
| 31a | 0.007 | 1071 | 5.68 | 2.02 | 5.03 |

Note) Molded product weight is showm in terms of average of 10 products (n = 10)

TABLE 10

(Example 5)

| Sample No. | Binder resin | Molding temp. [° C.] | (BH) max [MGOe] | Density [g/cm$^3$] | Porosity [%] | Mechanical strength [kgf/mm$^2$] |
|---|---|---|---|---|---|---|
| 32a | A | 150 | 17.0 | 6.21 | 2.52 | 5.10 |
| 33a | A | 180 | 17.5 | 6.28 | 1.42 | 7.10 |
| 34a | A | 200 | 18.2 | 6.34 | 0.48 | 7.70 |
| 35a | A | 300 | 17.8 | 6.32 | 0.79 | 7.61 |
| 36a | A | 360 | 16.2 | 6.32 | 0.79 | 7.55 |
| 37a | F | 190 | 16.9 | 6.36 | 2.70 | 8.10 |
| 38a | F | 220 | 17.1 | 6.40 | 2.09 | 8.51 |
| 39a | F | 250 | 17.5 | 6.44 | 1.48 | 9.25 |
| 40a | F | 300 | 18.0 | 6.50 | 0.56 | 9.78 |
| 41a | F | 350 | 17.6 | 6.50 | 0.56 | 9.65 |
| 42a | F | 400 | 15.5 | 6.50 | 0.56 | 9.60 |

TABLE 11

(Example 6)

| Sample No. | Binder resin | Press. release temp. [° C.] | (BH) max [MGOe] | Density [g/cm$^3$] | Porosity [%] | Outside dimension [mm] |
|---|---|---|---|---|---|---|
| 43a | A | 180 | 8.2 | 6.56 | 2.51 | 10.00 ± 0.03 |
| 44a | A | 170 | 8.5 | 6.62 | 1.62 | 10.01 ± 0.03 |
| 45a | A | 160 | 8.6 | 6.65 | 1.17 | 10.00 ± 0.02 |
| 46a | A | 140 | 8.6 | 6.67 | 0.87 | 10.01 ± 0.02 |
| 47a | A | 100 | 8.7 | 6.68 | 0.73 | 10.01 ± 0.01 |
| 48a | G | 283 | 7.7 | 6.60 | 3.53 | 10.03 ± 0.04 |
| 49a | G | 275 | 7.9 | 6.64 | 2.95 | 10.02 ± 0.04 |
| 50a | G | 260 | 8.3 | 6.74 | 1.49 | 10.01 ± 0.03 |
| 51a | G | 240 | 8.5 | 6.78 | 0.90 | 10.00 ± 0.01 |
| 52a | G | 200 | 8.5 | 6.79 | 0.76 | 10.00 ± 0.01 |

Note) Outside dimension is showm in terms of average over 10 spesima.

TABLE 12

(Example 7)

| Sample No. | Molding temp. [° C.] | Br [kG] | iHc [kOe] | (BH) max [MGOe] | Density [g/cm$^3$] | Porosity [%] | Mechanical strength [kgf/mm$^2$] |
|---|---|---|---|---|---|---|---|
| 1b | 170 | 6.87 | 9.91 | 10.2 | 6.14 | 3.74 | 6.97 |
| 2b | 175 | 6.94 | 9.90 | 10.6 | 6.20 | 2.80 | 6.99 |
| 3b | 180 | 7.05 | 9.92 | 11.4 | 6.30 | 1.23 | 7.11 |
| 4b | 200 | 7.08 | 9.91 | 11.5 | 6.33 | 0.76 | 7.53 |
| 5b | 220 | 7.07 | 9.90 | 11.5 | 6.33 | 0.76 | 7.51 |
| 6b | 240 | 7.04 | 9.85 | 11.2 | 6.31 | 1.07 | 7.58 |

TABLE 13

| Powder No | Powder type | Composition | Mean grain size [μm] |
|---|---|---|---|
| 1 | Nd—Fe—B | $Nd_{12.0}Fe_{77.8}Co_{4.8}B_{5.8}$ | 22 |
| 2 | Sm—Co | $Sm(Co_{0.872}Fe_{0.22}Cu_{0.08}Zr_{0.028})_{8.35}$ | 15 |
| 3 | Nanocrystalline Nd—Fe—B | $Nd_{5.5}Fe_{66}B_{10.5}Co_5Cr_6$ | 24 |
| 4 | Sm—Fe—N | $Sm_2Fe_{17}N_3$ | 2 |
| 5 | HDDR Nd—Fe—B | $Ne_{12.6}Fe_{68.3}Co_{12.0}B_{6.0}Zr_{0.1}$ | 25 |

TABLE 14

(Example 8)

| Sample No. | Powder No. | Press. release temp. [°C.] | Density [g/cm³] | Porosity [%] | Circularity [μm] |
|---|---|---|---|---|---|
| 7b | 1 | 185 | 5.81 | 3.97 | 29.9 |
| 8b | 1 | 170 | 5.88 | 2.81 | 17.3 |
| 9b | 1 | 155 | 5.93 | 1.98 | 12.7 |
| 10b | 1 | 140 | 6.00 | 0.82 | 5.2 |
| 11b | 1 | 100 | 6.01 | 0.66 | 4.1 |
| 12b | 2 | 190 | 6.34 | 4.22 | 29.5 |
| 13b | 2 | 180 | 6.36 | 3.91 | 27.6 |
| 14b | 2 | 170 | 6.42 | 3.00 | 21.0 |
| 15b | 2 | 155 | 6.49 | 1.95 | 12.5 |
| 16b | 2 | 140 | 6.57 | 0.74 | 5.5 |
| 17b | 2 | 110 | 6.59 | 0.43 | 4.8 |
| 18b | 3 | 180 | 5.82 | 3.80 | 29.1 |
| 19b | 3 | 165 | 5.93 | 1.98 | 19.3 |
| 20b | 3 | 140 | 5.98 | 1.16 | 7.6 |

Continues to Table 15

TABLE 15

(Example 8)

| Sample No. | Powder No. | Press. release temp. [°C.] | Density [g/cm³] | Porosity [%] | Circularity [μm] |
|---|---|---|---|---|---|
| 21b | 3 | 125 | 6.00 | 0.82 | 5.4 |
| 22b | 3 | 90 | 6.02 | 0.49 | 4.6 |
| 23b | 2 (75%) + 4 (25%) | 182 | 6.27 | 3.17 | 29.1 |
| 24b | 2 (75%) + 4 (25%) | 175 | 6.29 | 2.87 | 23.1 |
| 25b | 2 (75%) + 4 (25%) | 160 | 6.35 | 1.98 | 21.3 |
| 26b | 2 (75%) + 4 (25%) | 135 | 6.44 | 0.55 | 7.4 |
| 27b | 2 (75%) + 4 (25%) | 80 | 6.46 | 0.24 | 3.8 |
| 28b | 5 | 175 | 5.92 | 2.14 | 19.7 |
| 29b | 5 | 150 | 5.94 | 1.81 | 10.1 |
| 30b | 5 | 135 | 6.00 | 0.82 | 6.1 |
| 31b | 5 | 100 | 6.00 | 0.82 | 4.0 |

TABLE 16

| Resin No. | Binder resin (Thermoplastic resin) | Melting point [°C.] | Thermal deformation temp. [°C.] | Kneading temp. [°C.] | Molding temp. [°C.] |
|---|---|---|---|---|---|
| A | Polyamide resin (PA12) | 178 | 145 | 150~250 | 230 |
| B | Polyamide resin (Copolymer PA6-12) | 145 | 46 | 100~250 | 200 |
| C | Polyamide resin (PA6) | 215 | 180 | 200~280 | 270 |
| D | Polypropylene resin (PP) | 174 | 105 | 140~250 | 220 |
| E | Polypropylene resin (PE) | 128 | 86 | 100~200 | 180 |
| F | Liquid crystal polymer (LCP) | 280 | 180 | 250~350 | 320 |
| G | Polyphenylene sulfide (PPS) | 287 | 260 | 270~350 | 300 |
| A + B | Polyamide resin (mixture) (PA12:50% + PA6-12:50%) | 162 (Calculated value) | 96 (Calculated value) | 120~250 | 200 |

TABLE 17

(Example 9)

| Sample No. | Resin No. | Press. release temp. [°C.] | Density [g/cm³] | Porosity [%] | Circularity [μm] |
|---|---|---|---|---|---|
| 32b | A | 185 | 6.57 | 4.03 | 29.6 |
| 33b | A | 170 | 6.65 | 2.86 | 22.1 |
| 34b | A | 140 | 6.79 | 0.81 | 17.8 |
| 35b | A | 110 | 6.81 | 0.52 | 7.7 |
| 36b | A (50%) + B (50%) | 175 | 6.65 | 3.07 | 38.4 |
| 37b | A (50%) + B (50%) | 150 | 6.72 | 2.05 | 32.1 |
| 38b | A (50%) + B (50%) | 135 | 6.74 | 1.76 | 26.7 |
| 39b | A (50%) + B (50%) | 60 | 6.79 | 1.03 | 7.1 |
| 40b | A (50%) + B (50%) | 40 | 6.82 | 0.59 | 3.6 |

Continues to Table 18

TABLE 18

(Example 9)

| Sample No. | Resin No. | Press. release temp. [°C.] | Density [g/cm³] | Porosity [%] | Circularity [μm] |
|---|---|---|---|---|---|
| 41b | C | 215 | 6.68 | 4.00 | 26.6 |
| 42b | C | 210 | 6.70 | 3.72 | 21.1 |
| 43b | C | 190 | 6.74 | 3.14 | 15.5 |
| 44b | C | 170 | 6.80 | 2.28 | 9.6 |
| 45b | C | 125 | 6.92 | 0.56 | 6.4 |
| 46b | D | 180 | 6.47 | 3.54 | 28.9 |

TABLE 18-continued (Example 9)

| Sample No. | Resin No. | Press. release temp. [°C.] | Density [g/cm$^3$] | Porosity [%] | Circularity [μm] |
|---|---|---|---|---|---|
| 47b | D | 165 | 6.52 | 2.80 | 20.9 |
| 48b | D | 115 | 6.57 | 2.05 | 16.6 |
| 49b | D | 95 | 6.68 | 0.41 | 7.8 |
| 50b | E | 125 | 6.53 | 3.53 | 19.6 |
| 51b | E | 110 | 6.57 | 2.93 | 15.3 |

Continues to Table 19

TABLE 19

(Example 9)

| Sample No. | Resin No. | Press. release temp. [°C.] | Density [g/cm$^3$] | Porosity [%] | Circularity [μm] |
|---|---|---|---|---|---|
| 52b | E | 95 | 6.63 | 2.05 | 12.1 |
| 53b | E | 78 | 6.70 | 1.01 | 9.6 |
| 54b | F | 290 | 6.90 | 3.43 | 36.6 |
| 55b | F | 275 | 6.95 | 2.73 | 18.6 |
| 56b | F | 250 | 6.98 | 2.31 | 15.3 |
| 57b | F | 190 | 7.08 | 0.91 | 7.1 |
| 58b | F | 170 | 7.11 | 0.49 | 3.6 |
| 59b | G | 292 | 6.86 | 3.66 | 30.0 |
| 60b | G | 280 | 7.05 | 0.99 | 7.2 |
| 61b | G | 255 | 7.09 | 0.43 | 3.8 |
| 62b | G | 200 | 7.09 | 0.43 | 3.4 |

TABLE 20

| Composition | Magnetic powder [wt %] | Binder resin [wt %] | Antioxidant [wt %] | Other additive [wt %] |
|---|---|---|---|---|
| Composition 1 | 92.0 | 7.1 | 0.7 | Silicone oil 0.2 |
| Composition 2 | 94.0 | 4.7 | 1.2 | Oleic acid 0.1 |
| Composition 3 | 96.0 | 2.4 | 1.6 | — |
| Composition 4 | 98.0 | 1.0 | 1.0 | — |

TABLE 21

(Example 10)

| Sample No. | Composition | Press. release temp. [°C.] | Density [g/cm$^3$] | Porosity [%] | Circularity [μm] | (BH) max [MGOe] |
|---|---|---|---|---|---|---|
| 63b | Composition 1 | 178 | 4.81 | 3.97 | 29.4 | 6.0 |
| 64b | Composition 1 | 170 | 4.83 | 3.58 | 27.1 | 6.1 |
| 65b | Composition 1 | 140 | 4.86 | 2.98 | 22.1 | 6.1 |
| 66b | Composition 1 | 100 | 4.99 | 0.38 | 4.1 | 6.2 |
| 67b | Composition 2 | 178 | 5.27 | 3.79 | 27.9 | 7.0 |
| 68b | Composition 2 | 170 | 5.30 | 3.24 | 24.5 | 7.0 |
| 69b | Composition 2 | 140 | 5.35 | 2.33 | 17.1 | 7.1 |
| 70b | Composition 2 | 100 | 5.45 | 0.50 | 4.4 | 7.1 |

Continues to Table 22

TABLE 22

(Example 10)

| Sample No. | Composition | Press. release temp. [°C.] | Density [g/cm$^3$] | Porosity [%] | Circularity [μm] | (BH) max [MGOe] |
|---|---|---|---|---|---|---|
| 71b | Composition 3 | 180 | 5.82 | 3.91 | 28.9 | 9.2 |
| 72b | Composition 3 | 178 | 5.87 | 3.09 | 23.8 | 9.4 |
| 73b | Composition 3 | 170 | 5.89 | 2.76 | 17.8 | 9.6 |
| 74b | Composition 3 | 140 | 6.01 | 0.78 | 5.5 | 10.0 |
| 75b | Composition 3 | 100 | 6.02 | 0.61 | 4.3 | 10.1 |
| 76b | Composition 4 | 185 | 6.52 | 3.10 | 27.6 | 10.5 |
| 77b | Composition 4 | 178 | 6.57 | 2.36 | 19.7 | 10.6 |
| 78b | Composition 4 | 170 | 6.59 | 2.02 | 14.0 | 10.9 |
| 79b | Composition 4 | 140 | 6.62 | 1.62 | 5.1 | 11.2 |
| 80b | Composition 4 | 100 | 6.66 | 1.02 | 4.8 | 11.4 |

TABLE 23

| | Magnetic powder | Resin | Additive |
|---|---|---|---|
| Composition 1 | Nd—Fe—B (94.0 wt %) | Polyamide resin (No. A in Table 1) (4.8 wt %) | Hydrazine type antioxidant (1.2 wt %) |
| Composition 2 | Nd—Fe—B (97.0 wt %) | Polyamide resin (No. A in Table 1) (1.5 wt %) | Hydrazine type antioxidant (1.5 wt %) |
| Composition 3 | Sm—Co (92.5 wt %) | PPS resin (No. G in Table i) (7.45 wt %) | Stearic acid (0.05 wt %) |
| Composition 4 | Sm—Co + Sm—Fe—N (71 + 24 wt %) | Polypropylene resin (No. D in Table 1) (4.9 wt %) | Silicone oil (0.1 wt %) |
| Composition 5 | Nanocrystalline Nd—Fe—B (96.0 wt %) | Polyamide resin (PA11: Thermal deform temp. 150 C.) (3.0 wt %) | Hydrazine type antioxidant (1.0 wt %) |

TABLE 23-continued

| Composition 6 | Nd—Fe—B (HDDR process) (95.5 wt %) | Liquid crystal polymer (No. F in Table 1) (3.3 wt %) | Phenol type antioxidant (1.2 wt %) |
|---|---|---|---|

Nd—Fe—B: $Nd_{12.0}Fe_{77.8}Co_{4.8}B_{5.8}$ mean grain size 15 μm
Sm—Co: $Sm(Co_{0.872}Fe_{0.22}Cu_{0.08}Zr_{0.028})_{8.35}$ mean grain size 18 μm
Sm—Fe—N: $Sm_2Fe_{17}N_3$ mean grain size 2 μm
Nanocrystalline Nd—Fe—B: $Nd_{5.5}Fe_{66}B_{10.5}Co_5Cr_6$ mean grain size 20 μm
Nd—Fe—B (HDDR process): $Ne_{12.6}Fe_{68.3}Co_{12.0}B_{6.0}Zr_{0.1}$ mean grain size 20 μm

TABLE 24

(Example 11)

| Sample No. | Material | Molding temp. [° C.] | Br [kG] | iHc [kOe] | (BH) max [MGOe] | Density [g/cm³] | Porosity [%] |
|---|---|---|---|---|---|---|---|
| 1c | Composition 1 | 210 | 5.88 | 9.09 | 6.9 | 5.44 | 0.79 |
| 2c | Composition 2 | 230 | 7.48 | 9.32 | 11.2 | 6.33 | 0.81 |
| 3c | Composition 3 | 300 | 6.48 | 9.18 | 9.2 | 5.98 | 1.81 |
| 4c | Composition 4 | 200 | 9.05 | 12.02 | 17.5 | 6.54 | 0.94 |
| 5c | Composition 5 | 220 | 7.43 | 4.47 | 7.7 | 5.81 | 0.95 |
| 6c | Composition 6 | 290 | 8.55 | 13.7 | 15.9 | 6.12 | 1.10 |

Sample Nos. 1c, 2c, 5c: No magnetic field applied.
Sample Nos. 3c, 4c, 6c: Radial magnetic field of 15 kOe applied.

TABLE 25

(Comparison Ex. 3)

| Sample No. | Material | Molding temp. [° C.] | Molding press. [kgf/mm²] | Press. release temp [C.] | Density [g/cm³] | Porosity [%] |
|---|---|---|---|---|---|---|
| 7c | Composition 1 | 100 | 80 | 50 | 4.98 | 9.18 |
| 8c | Composition 2 | 120 | 80 | 50 | 5.70 | 10.68 |
| 9c | Composition 3 | 235 | 80 | 100 | 5.52 | 9.37 |
| 10c | Composition 4 | 90 | 80 | 30 | 5.35 | 8.79 |
| 11c | Composition 5 | 80 | 80 | 50 | 5.41 | 10.42 |
| 12c | Composition 6 | 150 | 80 | 60 | 5.44 | 12.10 |

Sample Nos. 7c, 8c, 11c: No magnetic field applied.
Sample Nos. 9c, 10c, 12c: Tadial magnetic field of 15 kOe applied.

TABLE 26

(Example 15)

| Sample NO. | Max. grain size [mm] | Mean grain size [mm] | Molded product density [g/cm³] | Porosity [%] | Molded product height [mm] |
|---|---|---|---|---|---|
| 21c | 2.0 | 1.5 | 6.42 | 0.42 | 9.95 |
| 22c | 1.0 | 0.8 | 6.42 | 0.42 | 9.99 |
| 23c | 0.5 | 0.45 | 6.41 | 0.58 | 10.00 |
| 24c | 0.3 | 0.2 | 6.40 | 0.73 | 10.00 |
| 25c | 0.1 | 0.05 | 6.37 | 1.20 | 10.02 |
| 26c | 0.05 | 0.04 | 6.30 | 2.28 | 10.04 |
| 27c | 0.02 | 0.01 | 6.26 | 2.50 | 10.05 |

TABLE 27

(Examle 16)

| Sample No. | "a" dimension [mm] | Weight of granular material [g] | Molded product weight [g] | Molded product length [mm] |
|---|---|---|---|---|
| 28c | 4.0 | 2.53 | 2.31 | 9.12 |
| 29c | 4.5 | 2.85 | 2.66 | 9.35 |
| 30c | 4.8 | 3.04 | 3.01 | 9.90 |
| 31c | 5.0 | 3.17 | 3.15 | 9.95 |
| 32c | 5.5 | 3.48 | 3.48 | 10.00 |
| 33c | 6.0 | 3.8 | 3.79 | 9.99 |

Industrial Applicability

By virtue of the advantages described hereinbefore, the present invention finds extensive use such as, for example, use as permanent magnets of various motors, e.g., stepping motors, brushless motors and so forth, permanent magnets of solenoids and actuators, permanent magnets of automotive sensors, permanent magnets of finders of VTRs or the like, and permanent magnets incorporated in various types of meters.

We claim:

1. A method for manufacturing a rare earth bonded magnet formed by binding a rare earth magnetic powder by a binder resin, comprising the steps of:

mixing said magnet powder and said binder resin and kneading the mixture at a temperature above a thermal deformation temperature of said binder resin so as to prepare a kneaded material;

granulating or graining the kneaded material to form the kneaded material into a granular material;

conducting a pressure molding on said granulated material at a first temperature more than 20° C. greater than a melting temperature of said binder resin at which said binder resin is softened or molten; and cooling the molded body while keeping said molded body under a constant pressure at least until said molded body is cooled down to a second temperature which is equal to or below said melting temperature of said binder resin.

2. A method of manufacturing a rare earth bonded magnet according to claim 1, wherein said binder resin is a thermoplastic resin.

3. A method of manufacturing a rare earth bonded magnet according to claim 1, wherein the content of said rare earth magnet powder in said kneaded material ranges from 90 wt % to 99 wt %.

4. A method of manufacturing a rare earth bonded magnet according to claim 1, wherein said kneaded material contains an antioxidant.

5. A method of manufacturing a rare earth bonded magnet according to claim 1, wherein the average granule size of said granular material ranges from 0.01 to 2 mm.

6. A method of manufacturing a rare earth bonded magnet according to claim 1, wherein said second temperature the thermal deformation temperature of said binder resin.

7. A method of manufacturing a rare earth bonded magnet according to claim 1, wherein the pressure applied to said molded body during cooling under pressure is maintained constant at a first pressure until the temperature falls to said melting temperature of said binder resin and then said pressure is reduced to a second pressure until the temperature falls to said thermal deformation temperature of said binder resin.

8. A method of manufacturing a rare earth bonded magnet according to claim 1, wherein the maximum granule size of said granular material is not greater than the minimum size of the gap in the mold used for the molding.

9. A method of manufacturing a rare earth bonded magnet according to claim 1, wherein the maximum granule size of said granular material is not smaller than 0.02 mm.

10. A method of manufacturing a rare earth bonded magnet according to claim 1, wherein the granulation or the graining is conducted by grinding.

11. A method of manufacturing a rare earth bonded magnet according to claim 1, further comprising the step of conducting a heat treatment subsequent to the molding.

12. A method of manufacturing a rare earth bonded magnet formed by binding a rare earth magnet powder by a thermoplastic binder resin, comprising the steps of:
conduction-molding a composition containing said rare earth magnet powder and said binding resin at a first temperature at least 50° C. greater than a melting temperature of said binder resin at which said binder resin is softened or molten; and
cooling the molded body while keeping said molded body under pressure until said molded body is cooled down to a thermal deformation temperature of said binder resin which is below said first temperature.

13. A method of manufacturing a rare earth bonded magnet according to claim 12, wherein said second temperature is the melting temperature or the thermal deformation temperature of said binder resin.

14. A method of manufacturing a rare earth bonded magnet according to claim 12, wherein the cooling under pressure is conducted continuously without releasing the pressure applied during the pressure molding.

15. A method of manufacturing a rare earth bonded magnet according to claim 12, wherein the pressure applied during the cooling under pressure is equal to or lower than the pressure applied during the pressure molding.

16. A method of manufacturing a rare earth bonded magnet according to claim 12, wherein the pressure applied during the cooling under pressure is maintained constant at least in the period in which the temperature comes down to the second temperature of said binder resin.

17. A method of manufacturing a rare earth bonded magnet according to claim 12, wherein the rate of cooling under pressure ranges from 0.5° C./sec to 100° C./sec.

18. A method of manufacturing a rare earth bonded magnet according to claim 12, wherein the pressure applied during the pressure molding is not higher than 60 kgf/mm².

19. The method of claim 12, wherein the content of said rare earth magnet powder in said magnet ranges from 92.0 wt % to 99.0 wt %.

20. The method of claim 12, wherein said magnet molded in the absence of magnetic field exhibits maximum magnetic energy product (BH)max of not lower than 6 MGOe.

21. The method of claim 12, wherein said magnet molded under the influence of a magnetic field exhibits maximum magnetic energy product (BH)max of not lower than 12 MGOe.

22. A method of manufacturing a rare earth bonded magnet formed by binding a rare earth magnet powder by a thermoplastic binder resin, comprising the steps of:
kneading a composition containing said rare earth magnet powder and said binding resin at a temperature which is not lower than the thermal deformation temperature of said binder resin;
pressure-molding the kneaded material at a first temperature at which said binder resin is softened or molten; and
cooling the molded body while keeping said molded body under a first pressure until said molded body is cooled down to a second temperature which is below said first temperature and further cooling the molded body while keeping said molded body under a second pressure which is about 50–80% of said first pressure.

23. A method of manufacturing a rare earth bonded magnet according to claim 22, wherein said second temperature is the melting temperature or the thermal deformation temperature of said binder resin.

24. A method of manufacturing a rare earth bonded magnet according to claim 22, wherein the difference between said first and second temperatures is not smaller than 20° C.

25. A method of manufacturing a rare earth bonded magnet according to claim 22, wherein the cooling under pressure is conducted continuously without releasing the pressure applied during the pressure molding.

26. A method of manufacturing a rare earth bonded magnet according to claim 22, wherein the pressure applied during the cooling under pressure is equal to or lower than the pressure applied during the pressure molding.

27. A method of manufacturing a rare earth bonded magnet according to claim 22, wherein the pressure applied during the cooling under pressure is maintained constant at least in the period in which the temperature comes down to the second temperature.

28. A method of manufacturing a rare earth bonded magnet according to claim 22, wherein the rate of cooling under pressure ranges from 0.5° C./sec to 100° C./sec.

29. A method of manufacturing a rare earth bonded magnet according to claim 23, wherein the pressure applied during the pressure molding is not higher than 60 kgf/mm².

30. The method of claim 22, wherein the content of said rare earth magnet powder in said magnet ranges from 92.0 wt % to 99.0 wt %.

31. The method of claim 22, wherein said magnet molded in the absence of magnetic field exhibits maximum magnetic energy product (BH)max of not lower than 6 MGOe.

32. The method of claim 22, wherein said magnet molded under the influence of a magnetic field exhibits maximum magnetic energy product (BH)max of not lower than 12 MGOe.

* * * * *

UNITED STATES PATENT AND TRADEMARK OFFICE
CERTIFICATE OF CORRECTION

PATENT NO.    : 6,001,272
DATED         : December 14, 1999
INVENTOR(S)   : Ken Ikuma et al.

It is certified that error appears in the above-identified patent and that said Letters Patent is hereby corrected as shown below:

Title page,
Item [57], ABSTRACT,
Line 14, "s" should be -- is --

Column 2,
Line 17, delete "a"

Column 4,
Line 66, delete "enables" and insert -- enable -- therefor

Column 5,
Line 29, delete "rate" and insert -- rates -- therefor
Line 42, delete "and" and insert -- to -- therefor
Line 52, delete "composition" and insert -- compositions -- therefor Column 6,
Line 62, after "Powder" begin a new paragraph Column 10,
Line 10, "it" should be -- It --

Column 11,
Line 37, "$A_nTn$" should read -- $A_nT_n$ --

Column 12,
Line 67, delete "ensured" and insert -- insures --

Column 15,
Line 38, delete "ensured" and insert -- insures --

Column 16,
Line 5, "tubulAr" should be -- tubular --
Line 41, delete "though" and insert -- through -- therefor
Lines 47 and 54, delete "be"

UNITED STATES PATENT AND TRADEMARK OFFICE
CERTIFICATE OF CORRECTION

PATENT NO. : 6,001,272
DATED : December 14, 1999
INVENTOR(S) : Ken Ikuma et al.

It is certified that error appears in the above-identified patent and that said Letters Patent is hereby corrected as shown below:

Column 17,
Line 55, "(S EM)" should be -- (SEM) --

Column 18,
Line 12, "$CO_{4.3}$" should be -- $Co_{4.3}$ --
Lines 37 and 44, delete "be"

Column 19,
Line 15, after "be" insert -- a --
Line 43, "$Cuo_{.06}$" should be -- $Cu_{0.06}$ --

Column 20,
Line 29, "it" should be -- It --
Line 64, delete "cooled" and insert -- cooling -- therefor Column 21,
Line 6, "21 a" should be -- 21a --
Line 63, delete "slid" and insert -- solid -- therefor Column 22,
Line 20, "$Co_{0.0672}$" should be -- $Co_{0.672}$ --
Line 52, "20 C/sec" should be -- 20°C/sec --

Column 23,
Line 53, "thick" should be -- thick) --
Line 67, delete "cold" and insert -- could -- therefor Column 24,
Line 67, "+ 5/100" should be -- ± 5/100 --

Column 27,
Line 9, after "seen" insert -- in --
Line 46, delete "be"

UNITED STATES PATENT AND TRADEMARK OFFICE
CERTIFICATE OF CORRECTION

PATENT NO.    : 6,001,272
DATED         : December 14, 1999
INVENTOR(S)   : Ken Ikuma et al.

It is certified that error appears in the above-identified patent and that said Letters Patent is hereby corrected as shown below:

Column 28,
Line 13, after "seen" insert -- in --

Column 29,
Line 18, "tables" should be -- Tables --
Line 21, after "seen" insert -- in --
Line 59, delete "be"

Column 31,
Line 41, after "diameter" insert -- x --

Column 32,
Line 6, "20 pm" should be -- 20 $\mu$m --

Column 36,
Line 24, delete "be"
Line 38, delete "these" and insert -- this -- therefore Column 37,
Line 26, "table" should be -- Table --

Column 40,
Lines 14 and 52, "Note)" should be -- Note: --
Line 52, delete "showm" and insert -- shown -- therefor Column 44,
Line 52, "Table i" should be -- Table 1 --

Column 45,
Line 51, delete "Tadial" and insert -- Radial -- therefor

Column 46,
Line 15, delete "Examle" and insert -- Example -- therefor
Line 46, delete "conducting a pressure"
Line 46, delete "on"
Line 47, after "material" insert -- under pressure --

UNITED STATES PATENT AND TRADEMARK OFFICE
CERTIFICATE OF CORRECTION

PATENT NO.   : 6,001,272
DATED        : December 14, 1999
INVENTOR(S)  : Ken Ikuma et al.

It is certified that error appears in the above-identified patent and that said Letters Patent is hereby corrected as shown below:

Column 47,
Line 2, after "temperature" insert -- equals --
Line 28, delete "conduction-"
Line 29, after "resin" insert -- under pressure --

Column 48,
Line 49, "claim 23" should be -- claim 22 --
Line 55, after "of" insert -- a --

Signed and Sealed this

Seventeenth Day of June, 2003

JAMES E. ROGAN
*Director of the United States Patent and Trademark Office*